US012370101B2

(12) United States Patent
Pfeiffer et al.

(10) Patent No.: US 12,370,101 B2
(45) Date of Patent: **\*Jul. 29, 2025**

(54) PATIENT TRANSPORT APPARATUS HAVING CASTER ASSEMBLY BIASING MECHANISMS

(71) Applicant: Stryker Corporation, Kalamazoo, MI (US)

(72) Inventors: Trey Thomas Pfeiffer, Portage, MI (US); Nathan W. Matheny, Portage, MI (US); Patrick Grossman, Grand Haven, MI (US); Adam Kammers, University Place, WA (US)

(73) Assignee: Stryker Corporation, Portage, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/655,385

(22) Filed: May 6, 2024

(65) Prior Publication Data

US 2024/0285452 A1 Aug. 29, 2024

Related U.S. Application Data

(63) Continuation of application No. 17/926,702, filed as application No. PCT/US2021/034412 on May 27, 2021, now Pat. No. 12,005,009.

(Continued)

(51) Int. Cl.
*A61G 5/08* (2006.01)

(52) U.S. Cl.
CPC .......... *A61G 5/0808* (2016.11); *A61G 5/0883* (2016.11)

(58) Field of Classification Search
CPC ...... A61G 5/0808; A61G 5/0883; A61G 5/08; A61G 5/085; A61G 5/0833; A61G 5/0891
(Continued)

(56) References Cited

U.S. PATENT DOCUMENTS 4,542,918 A 9/1985 Singleton
5,076,602 A * 12/1991 Robertson ............ A61G 5/1059
297/378.12

(Continued)

FOREIGN PATENT DOCUMENTS

EP 2105324 A1 9/2009
GB 1046444 A 10/1966
(Continued)

OTHER PUBLICATIONS

International Search Report for Application No. PCT/US2021/034412 dated Aug. 25, 2021, 1 page.

(Continued)

*Primary Examiner* — James A Shriver, II
*Assistant Examiner* — Hilary L Johns
(74) *Attorney, Agent, or Firm* — Howard & Howard Attorneys PLLC

(57) ABSTRACT

A patient transport apparatus including a support structure movable between a chair configuration for traversing floor surfaces and a stowed configuration for storage. A seat section is pivotably coupled to the support structure. A caster assembly includes a pin coupled to the support structure and defining a swivel axis, a caster frame arranged to pivot about the swivel axis between a plurality of caster orientations, a wheel coupled to the caster frame and arranged for engagement with the floor in the chair configuration, and a biasing mechanism interposed between the caster frame and the pin. The biasing mechanism urges the caster frame toward a stowed caster orientation in response to disengagement between the wheel and floor surfaces occurring as the support structure moves from the chair configuration to the stowed configuration.

20 Claims, 20 Drawing Sheets

Related U.S. Application Data

(60) Provisional application No. 63/030,510, filed on May 27, 2020.

(58) Field of Classification Search
USPC ......................................................... 280/650
See application file for complete search history.

(56) References Cited

U.S. PATENT DOCUMENTS

| | | | |
|---|---|---|---|
| 7,383,611 | B2 | 6/2008 | Foster |
| 8,113,305 | B1 * | 2/2012 | Flowers ................. A61G 5/125 180/19.1 |
| 9,050,226 | B2 * | 6/2015 | Husted ................... A61G 5/085 |
| 9,649,881 | B2 | 5/2017 | Warncke et al. |
| 10,004,651 | B2 | 6/2018 | DeLuca et al. |
| 10,406,043 | B2 * | 9/2019 | Lambarth ................ A61G 1/02 |
| 10,568,792 | B2 | 2/2020 | Derenne et al. |
| 2015/0014959 | A1 * | 1/2015 | Youngmann ............. A61G 5/00 180/22 |
| 2015/0060156 | A1 * | 3/2015 | Husted ................. A61G 5/1035 297/423.26 |
| 2018/0028377 | A1 | 2/2018 | Stryker et al. |
| 2020/0138655 | A1 | 5/2020 | Derenne et al. |
| 2020/0179191 | A1 | 6/2020 | Trimble et al. |
| 2021/0196536 | A1 | 7/2021 | Tessmer et al. |
| 2023/0046297 | A1 * | 2/2023 | Matheny .................. A61G 5/04 |
| 2023/0201053 | A1 | 6/2023 | Pfeiffer et al. |

FOREIGN PATENT DOCUMENTS

| | | | | |
|---|---|---|---|---|
| GB | 2209312 A | * | 5/1989 | ............. A61G 5/08 |
| WO | 2021138175 A1 | | 7/2021 | |

OTHER PUBLICATIONS

European Search Report for Application EP 21 813 917.8 dated Feb. 7, 2024, 6 pages.

* cited by examiner

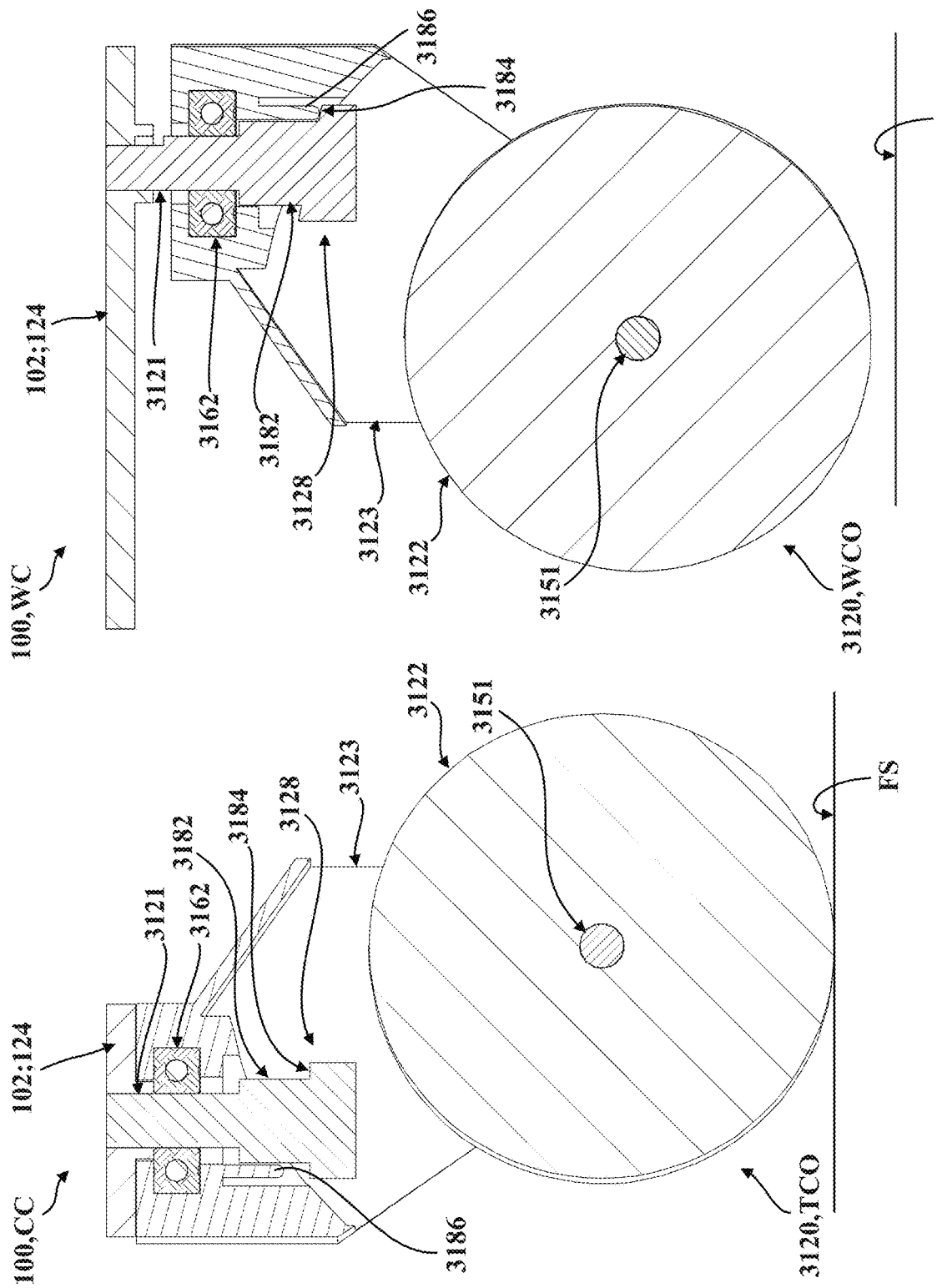

PATIENT TRANSPORT APPARATUS HAVING CASTER ASSEMBLY BIASING MECHANISMS

CROSS-REFERENCE TO RELATED APPLICATIONS

The subject patent application is a Continuation of U.S. patent application Ser. No. 17/926,702 filed on Nov. 21, 2022, which is the U.S. National Stage Entry of International Patent Application No. PCT/US2021/034412 filed on May 27, 2021, which claims the benefit of priority to U.S. Provisional Patent Application No. 63/030,510 filed on May 27, 2020, the disclosures of each of which are hereby incorporated by reference in their entirety.

BACKGROUND

In many instances, patients with limited mobility may have difficulty traversing stairs without assistance. In certain emergency situations, traversing stairs may be the only viable option for exiting a building. In order for a caregiver to transport a patient along stairs in a safe and controlled manner, a stair chair or evacuation chair may be utilized. Stair chairs are adapted to transport seated patients either up or down stairs, with two caregivers typically supporting, stabilizing, or otherwise carrying the stair chair with the patient supported thereon.

Many types of patient transport apparatuses are stored when not in use, and are taken out of storage relatively quickly to transport patients in certain emergency situations. Here, it will be appreciated that caregivers need to be able to transition patient transport apparatuses between use and storage configurations in a quick, reliable, and straightforward manner. To this end, certain types of patient transport apparatuses, such as stair chairs, may fold or collapse to allow for better storage capabilities.

In transitioning between utilizing the patient transport apparatus and storing the patient transport apparatus, certain components or structural features may fold, collapse, or articulate in certain ways to help minimize the overall footprint of the patient transport apparatus during storage. However, the process of transitioning certain types of conventional patient transport apparatuses for storage may be complicated, and may necessitate that the caregiver articulate certain components or structural features according to a specific predetermined sequence in order to ensure that the overall footprint is minimized during storage. If improperly transitioned, certain components may "stick out" and increase the footprint, and/or the patient transport apparatus may be unable to become secured in a stowed configuration.

A patient transport apparatus designed to overcome one or more of the aforementioned challenges is desired.

SUMMARY

The present disclosure provides a patient transport apparatus including a support structure movable between a chair configuration for traversing floor surfaces and a stowed configuration for storage. A seat section is provided for supporting the patient, and is pivotably coupled to the support structure. A caster assembly is provided, and includes a pin coupled to the support structure for concurrent movement between the chair configuration and the stowed configuration. The pin defines a swivel axis. The caster assembly further includes a caster frame arranged to pivot about the swivel axis between a plurality of caster orientations including a stowed caster orientation. A wheel is coupled to the caster frame. The wheel is supported for rotation about a wheel axis and is arranged for engagement with floor surfaces when the support structure is in the chair configuration. A biasing mechanism interposed between the caster frame and the pin to urge the caster frame toward the stowed caster orientation in response to disengagement between the wheel and floor surfaces occurring as the support structure moves from the chair configuration to the stowed configuration.

BRIEF DESCRIPTION OF THE DRAWINGS

Other advantages of the present invention will be readily appreciated as the same becomes better understood by reference to the following detailed description when considered in connection with the accompanying drawings.

FIG. 14 is a sectional view taken along reference 14-14 in FIG. 12.

FIG. 15 is a sectional view taken along reference 15-15 in FIG. 13.

DETAILED DESCRIPTION

Figure 1A:
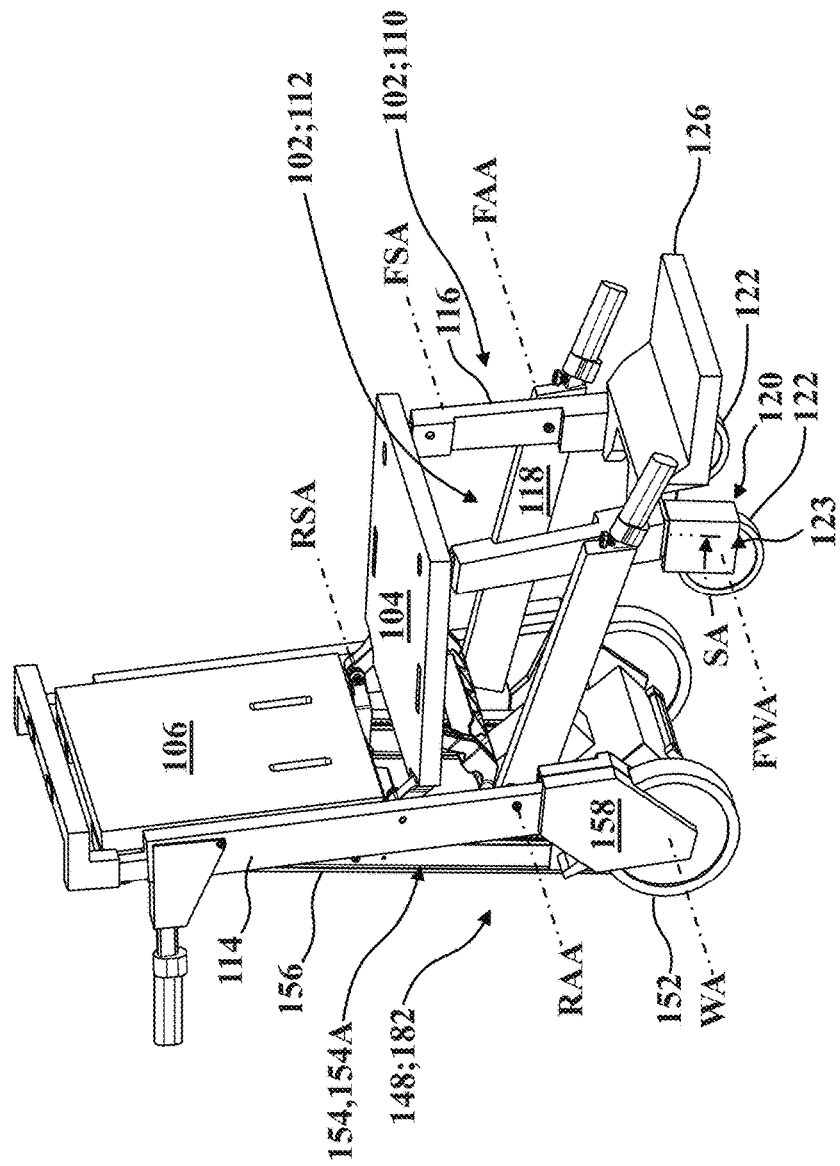
FIG. 1A is a front perspective view of a patient transport apparatus according to the present disclosure, shown arranged in a chair configuration for supporting a patient for transport along a floor surface.

Referring now to the drawings, wherein like numerals indicate like parts throughout the several views, the present disclosure is generally directed toward a patient transport apparatus 100 configured to allow one or more caregivers to transport a patient. To this end, the patient transport apparatus 100 is realized as a "chair" which can be operated in a chair configuration CC (see FIGS. 1A and 2A) to transport the patient across ground or floor surfaces FS (e.g., pavement, hallways, and the like), a stair configuration SC (see FIG. 2D) for transporting patients up or down stairs ST, as well as in a stowed configuration WC (see FIG. 2C) when not being utilized to transport patients (e.g., for storage).

As is best shown in FIG. 1A, the patient transport apparatus 100 comprises a support structure 102 to which a seat section 104 and a back section 106 are operatively attached. The seat section 104 and the back section 106 are each shaped and arranged to provide support to the patient during transport. The support structure 102 generally includes a rear support assembly 108, a front support assembly 110, and an intermediate support assembly 112. The support structure 102 is movable between the chair configuration CC for traversing floor surfaces FS and the stowed configuration WC for storage. The seat section 104 is pivotably coupled to the support structure 102. The back section 106 is coupled to the rear support assembly 108 for concurrent movement. To this end, the rear support assembly 108 comprises rear uprights 114 which extend generally vertically and are secured to the back section 106 such as with fasteners (not shown in detail). The rear uprights 114 are spaced generally laterally from each other in the illustrated configurations, and are formed from separate components which cooperate to generally define the rear support assembly 108. However, those having ordinary skill in the art will appreciate that other configurations are contemplated, and the rear support assembly 108 could comprise or otherwise be defined by any suitable number of components. The front support assembly 110 comprises front struts 116 which, like the rear uprights 114, are spaced laterally from each other and extend generally vertically. The intermediate support assembly 112 comprises intermediate arms 118 which are also spaced laterally from each other. Here too, it will be appreciated that other configurations are contemplated, and the front support assembly 110 and/or the intermediate support assembly 112 could comprise or otherwise be defined by any suitable number of components.

Figure 1B:
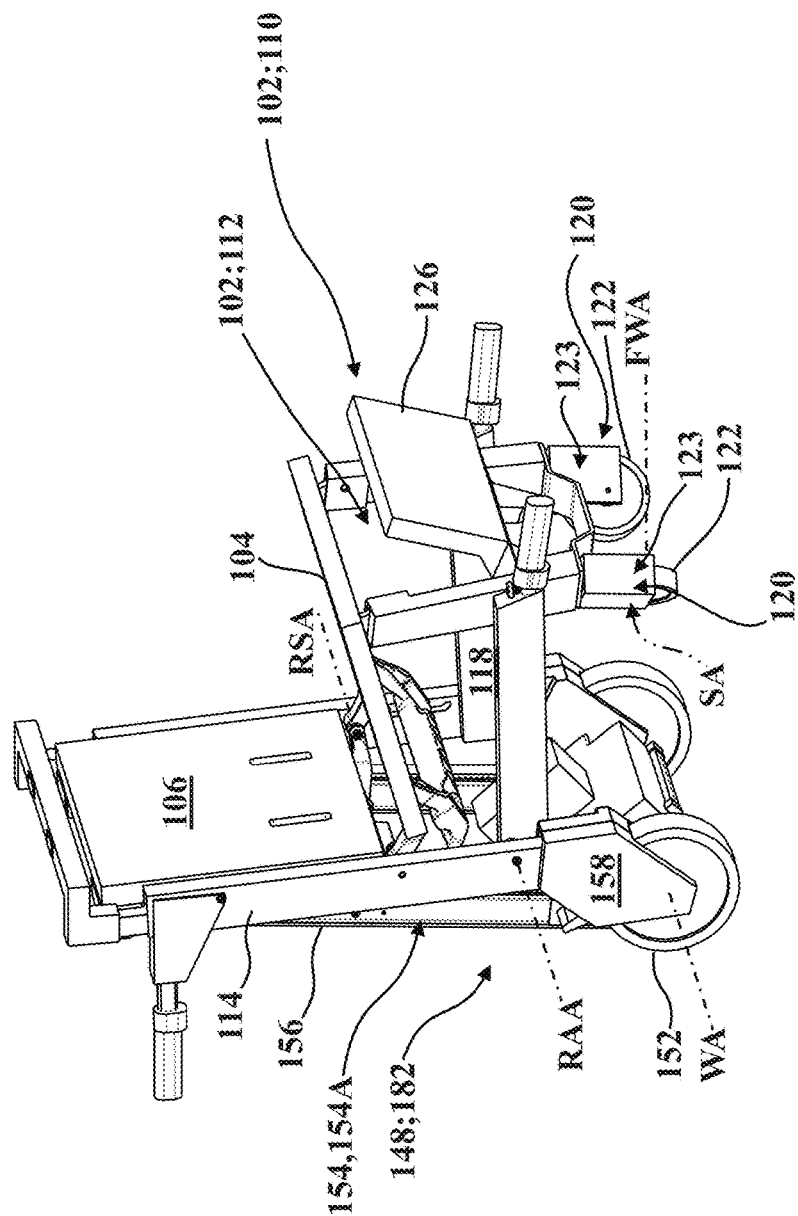
FIG. 1B is another front perspective view of the patient transport apparatus of FIG. 1A according to the present disclosure, shown arranged in a transitional configuration.

Referring to FIG. 1B, the intermediate support assembly 112 and the seat section 104 are each pivotably coupled to the rear support assembly 108. More specifically, the seat section 104 is arranged so as to pivot about a rear seat axis RSA which extends through the rear uprights 114, and the intermediate arms 118 of the intermediate support assembly 112 are arranged so as to pivot about a rear arm axis RAA which is spaced from the rear seat axis RSA and also extends through the rear uprights 114. Furthermore, the intermediate support assembly 112 and the seat section 104 are also each pivotably coupled to the front support assembly 110. Here, the seat section 104 pivots about a front seat axis FSA which extends through the front struts 116, and the intermediate arms 118 pivot about a front arm axis FAA which is spaced from the front seat axis FSA and extends through the front struts 116. The intermediate support assembly 112 is disposed generally vertically below the seat section 104 such that the rear support assembly 108, the front support assembly 110, the intermediate support assembly 112, and the seat section 104 generally define a four-bar linkage which helps facilitate movement between the stowed configuration WC (see FIG. 2C) and the chair configuration CC (see FIG. 2A).

Figure 2A:
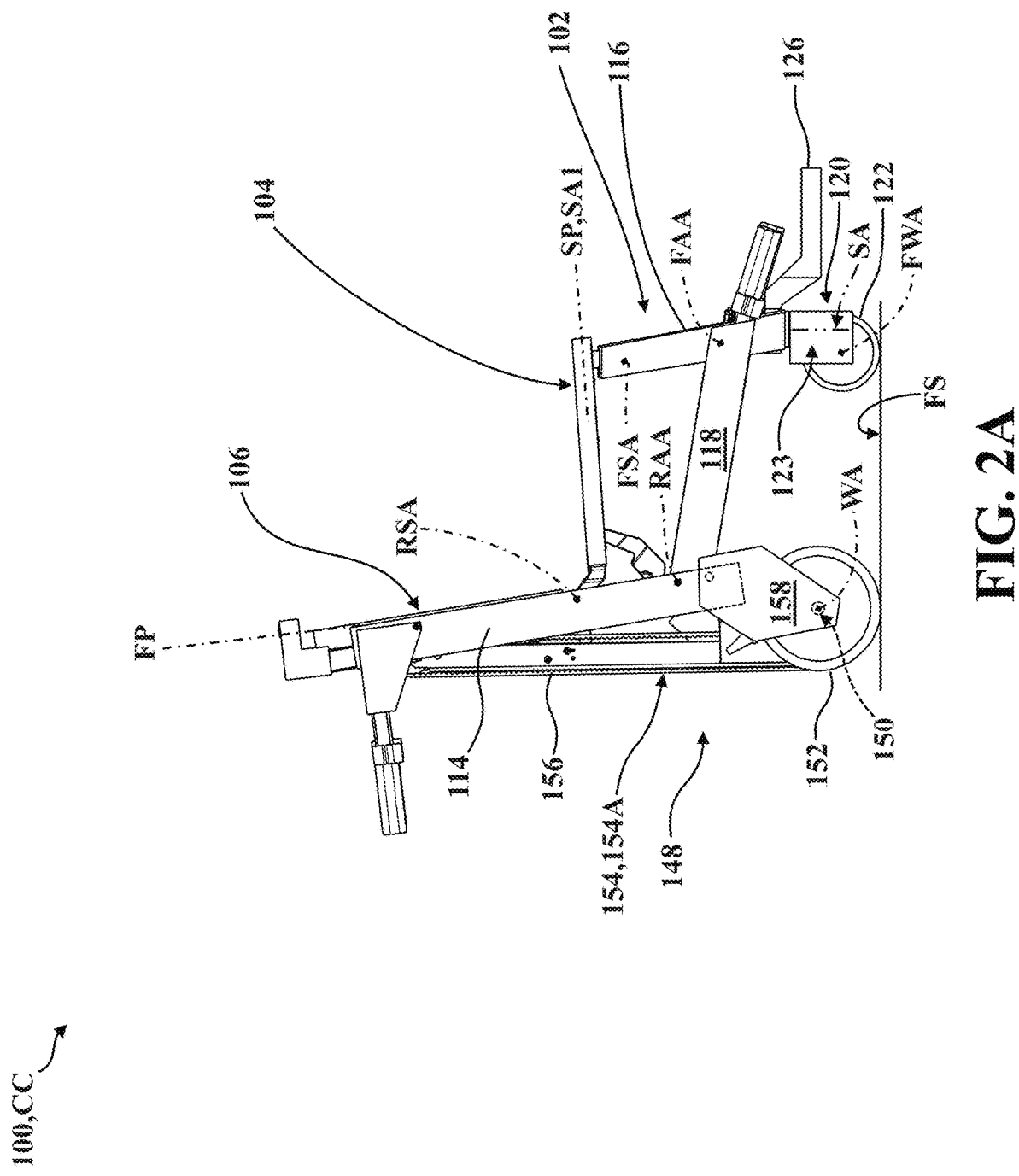
FIG. 2A is a right-side plan view of the patient transport apparatus of FIGS. 1A-1B, shown arranged in the chair configuration as depicted in FIG. 1A.
Figure 2B:
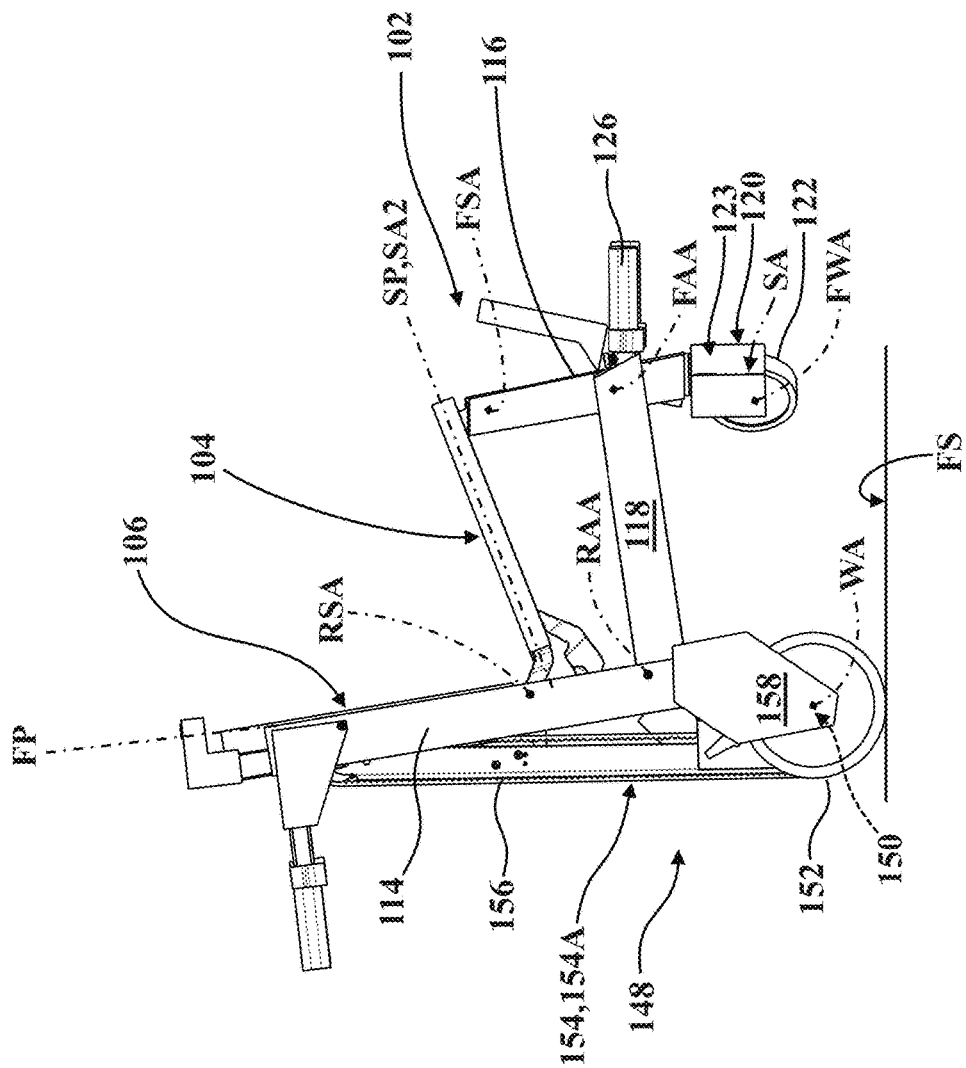
FIG. 2B is another right-side plan view of the patient transport apparatus of FIGS. 1A-2A, shown arranged in the transitional configuration as depicted in FIG. 1B.
Figure 2C:
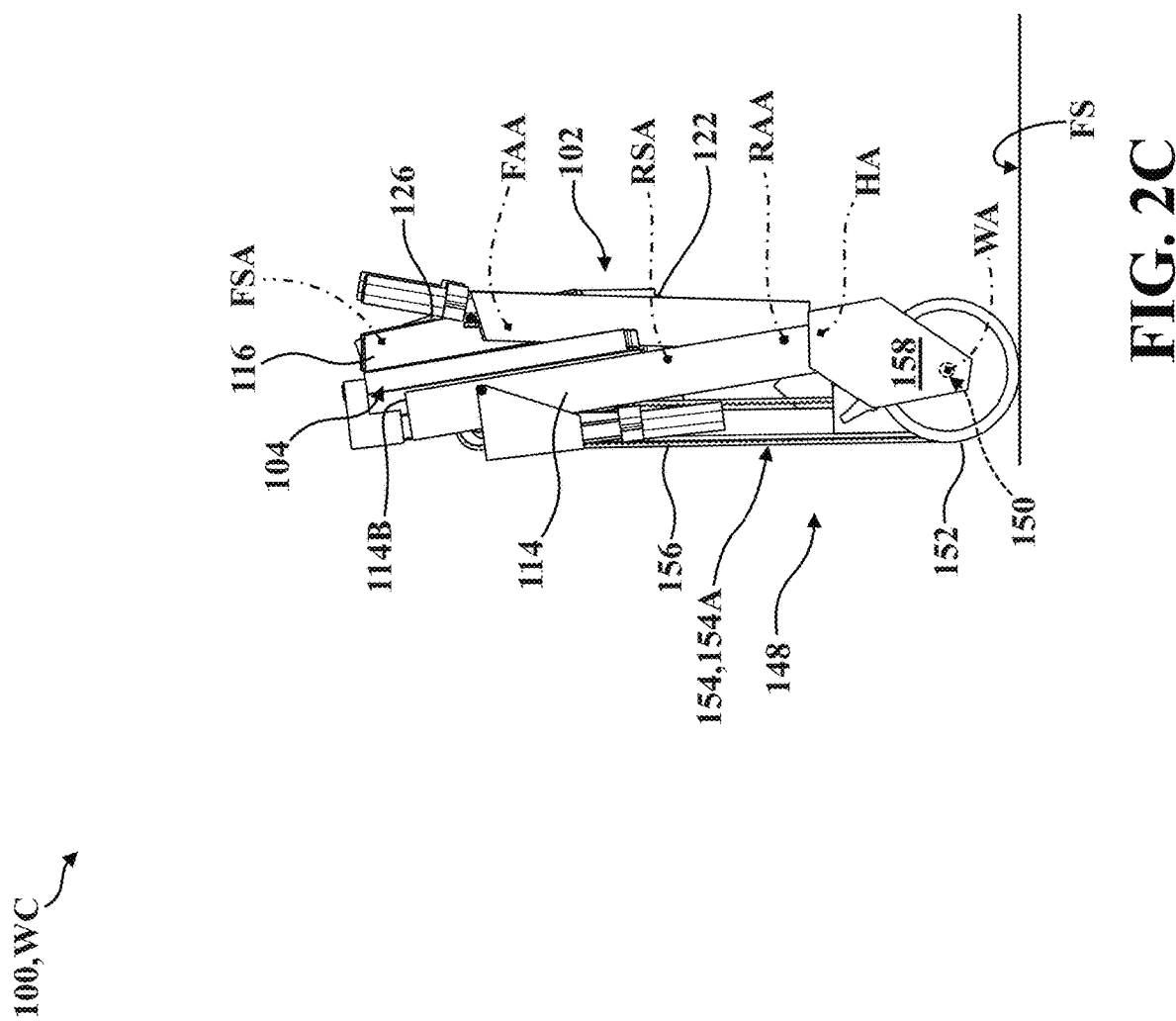
FIG. 2C is another right-side plan view of the patient transport apparatus of FIGS. 1A-2B, shown arranged in a stowed configuration.
Figure 2D:
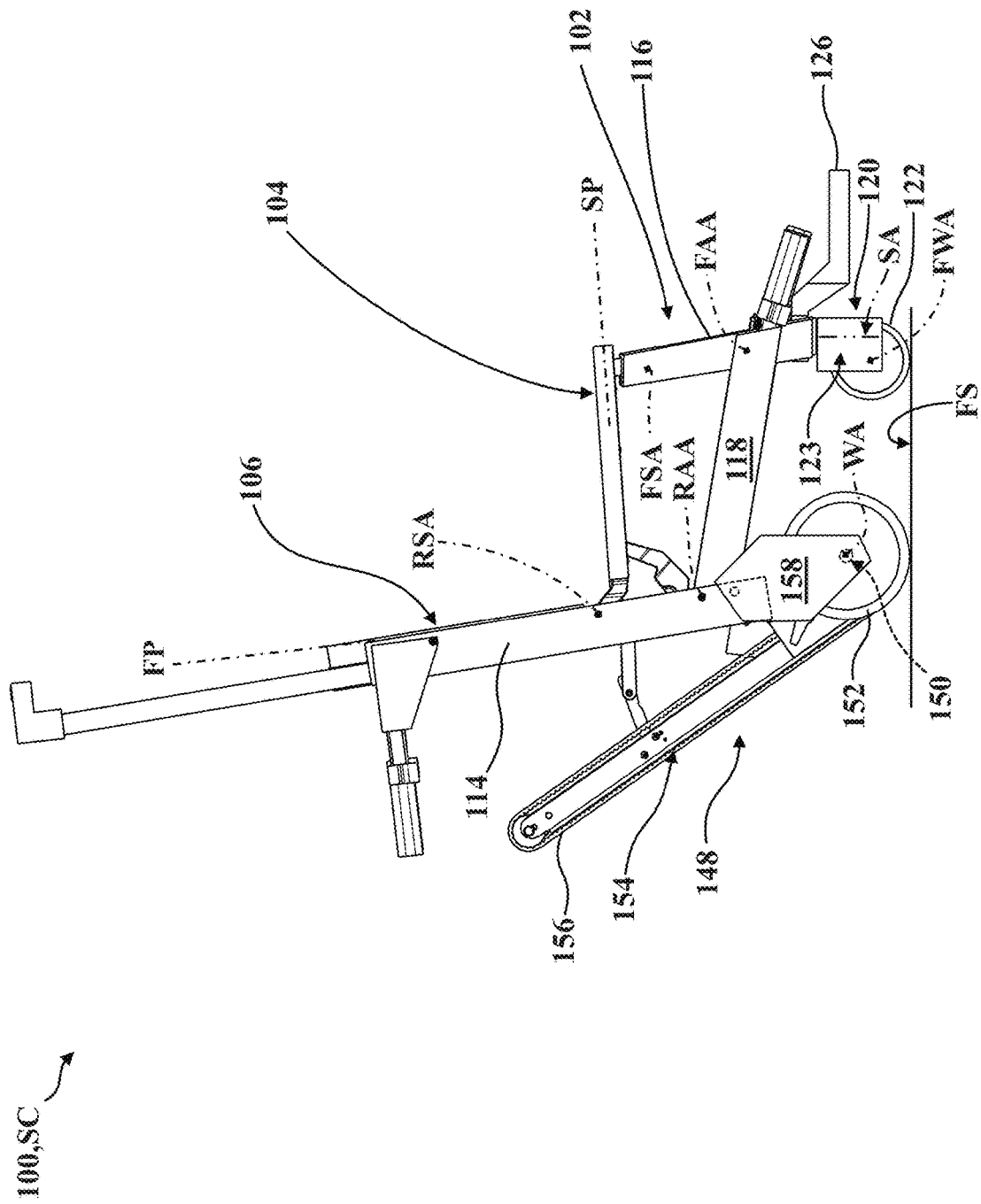
FIG. 2D is another right-side plan view of the patient transport apparatus of FIGS. 1A-2C, shown arranged in a stair configuration.

FIGS. 2A and 2B are a right-side plan view of the patient transport apparatus 100 of FIGS. 1A and 1B successively depicting exemplary steps of transitioning the patient transport apparatus 100 from the chair configuration CC to the stowed configuration WC. As noted above, the patient transport apparatus 100 is configured for use in transporting the patient across floor surfaces FS in the chair configuration CC, and for storage in the stowed configuration WC. To this end, the support structure 102 is movable between the chair configuration CC and the stowed configuration WC. While the seat section 104 is generally configured to remain stationary relative to the support structure 102 when operating in the chair configuration CC according to the illustrated configurations, it is contemplated that the seat section 104 could comprise multiple components which cooperate to facilitate "sliding" movement relative to the seat section 104 under certain operating conditions, such as to position the patient's center of gravity advantageously for transport. Here, the seat section 104 (or a portion thereof) could slide forward/backward, laterally, or combinations thereof; and, in some configurations, one or more biasing elements could be provided to urge the seat section 104 (or a portion thereof) in certain directions (e.g., forward/backward, centered laterally, and the like). Other configurations are contemplated. Additionally, it is contemplated that the seat section 104 could comprise multiple components which cooperate to facilitate "folding" movement relative to the back section 106 under certain conditions.

Referring now to FIG. 2B, the back section 106 defines a first plane FP and the seat section 104 defines a second plane SP arranged at a seat angle SA1 relative to the first plane FP. The first plane FP intersects the rear seat axis RSA and is fixed relative to the rear upright 114. The first plane FP generally defines a longitudinal side LS1 that generally faces towards the front of the patient transport apparatus 100 (e.g., toward the front support assembly 110). The second plane SP interests the rear seat axis RSA and is relatively perpendicular to the first plane FP in the chair configuration CC. The second plane SP defines a longitudinal side LS2 that generally faces upwards (e.g., away from floor surfaces FS). As the support structure 102 moves from the stowed configuration WC to the chair configuration CC, shown in FIG. 2B in a transitional configuration TC, the seat angle SA1 of the seat section 104 increases to a second seat angle SA2 (compare arrangement of second plane SP relative to floor surface FS in FIGS. 2A-2B). The seat angle SA1 may increase by a range between 1 to 90 degrees relative to the first plane FP. Here, movement of the support structure 102 from the chair configuration CC to the stowed configuration WC moves the longitudinal side LS2 of the seat section 104 towards the longitudinal side LS1 of the back section 106 such that the longitudinal sides LS1 and LS2 generally face each other in the stowed configuration WC.

The patient transport apparatus 100 may employ a folding lock mechanism (not shown in detail) to facilitate changing between the stowed configuration WC and the chair configuration CC. To this end, the folding lock mechanism generally comprises a folding lock release operatively attached to the back section 106 and arranged for engagement by the caregiver to releasably secure the folding lock mechanism between a stow lock configuration to maintain the stowed configuration WC, and a use lock configuration to prevent movement to the stowed configuration WC from the chair configuration CC or from a stair configuration SC. It will be appreciated that the folding lock mechanism could be configured in other ways sufficient to releasably lock the patient transport apparatus 100 in the stowed configuration WC, the stair configuration SC, and the chair configuration CC, and it is contemplated that one lock mechanism could lock the patient transport apparatus 100 in the stowed configuration WC while a different lock mechanism could lock the patient transport apparatus 100 in the stair configuration SC and/or the chair configuration CC. Other configurations are contemplated. In some versions, the folding lock mechanism, as well as other components and/or structural features of the patient transport apparatus 100, may be similar to those disclosed in U.S. Provisional Patent Application No. 62/954,951 filed on Dec. 30, 2019 and titled "PATIENT TRANSPORT APPARATUS FOR TRAVERSING STAIRS," the disclosure of which is hereby incorporated by reference in its entirety.

Referring to FIGS. 1A-2C, the front support assembly 110 includes a pair of caster assemblies 120. The caster assemblies 120 each include a pin 121 coupled to the support structure 102 for concurrent movement therewith. The pins 121 each define a respective swivel axis SWA. The caster assemblies 120 also each include a respective caster frame 123 arranged to pivot about the swivel axis SWA, and a wheel 122 coupled to the caster frame 123 and supported for rotation about a respective front wheel axis FWA. In the illustrated versions, a bearing 162 coupled to the caster frame 123 rotatably supports the pin 121 about the swivel axis SWA, and one or more bushings 129 and a front shaft 151 (see FIG. 5) may be employed to rotatably support the wheel 122 for rotation about the front wheel axis FWA. In the representative versions illustrated herein, the wheel 122 may also be referred to as a front wheel 122. However, it will be appreciated that other configurations are contemplated, and versions of the caster assemblies 120 of the present disclosure could be utilized in other areas of the patient transport apparatus 100 without departing from the scope of the present disclosure.

The front wheels 122 are arranged for engagement with floor surfaces FS when the support structure 102 is in the chair configuration CC. The caster assemblies 120 are generally arranged on opposing lateral sides of the front support assembly 110, and are operatively attached to the front struts 116. A lateral brace 124 (see FIG. 1B) extends laterally between the front struts 116 to, among other things, afford rigidity to the support structure 102. Here, a footrest 126 is pivotably coupled to each of the front struts 116 adjacent to the caster assemblies 120 (pivoting not shown in detail) to provide support to the patient's feet during transport. For each of the pivotable connections disclosed herein, it will be appreciated that one or more fasteners, bushings, bearings, washers, spacers, and the like may be provided to facilitate smooth pivoting motion between various components.

As noted above, the patient transport apparatus 100 can be operated in the chair configuration CC to transport the patient across ground or floor surfaces FS, as well as in the stair configuration SC to transport the patient along stairs. To these ends, the illustrated patient transport apparatus 100 includes a carrier assembly 148 arranged for movement relative to the support structure 102 between the chair configuration CC and the stair configuration SC. The carrier assembly 148 generally comprises at least one shaft 150 defining a wheel axis WA, one or more rear wheels 152 supported for rotation about the wheel axis WA, at least one track assembly 154 having a belt 156 for engaging stairs ST, and one or more hubs 158 supporting the shaft 150 and the track assembly 154 and the shaft 150 for concurrent pivoting movement about a hub axis HA. Here, movement of the carrier assembly 148 from the chair configuration CC to the stair configuration SC simultaneously deploys the track assembly 154 for engaging stairs ST with the belt 156 and moves the wheel axis WA longitudinally closer to the front support assembly 110 so as to position the rear wheels 152 further underneath the seat section 104 and closer to the front wheels 122.

The movement of the rear wheels 152 relative to the front wheels 122 when transitioning from the chair configuration CC to the stair configuration SC that is afforded by the patient transport apparatus 100 of the present disclosure affords significant improvements in patient comfort and caregiver usability, in that the rear wheels 152 are arranged to promote stable transport across floor surfaces FS in the chair configuration CC but are arranged to promote easy transitioning from floor surfaces FS to stairs ST as the patient transport apparatus 100 is "tilted" backwards about the rear wheels 152. Put differently, positioning the rear wheels 152 relative to the front wheels 122 makes "tilting" the patient transport apparatus 100 significantly less burdensome for the caregivers and, at the same time, much more comfortable for the patient due to the arrangement of the patient's center of gravity relative to the portion of the rear wheels 152 contacting the floor surface FS as the patient transport apparatus 100 is "tilted" backwards to transition into engagement with the stairs ST. Contrarily, the rear wheels 152 remain fixed relative to the front wheels 122 when transitioning from the chair configuration CC to the stowed configuration WC. As the support structure 102 moves from the chair configuration CC to the stowed configuration WC, the rear wheel 152 is configured to remain in engagement with the floor surfaces FS whereas the front wheels 122 disengages with the floor surfaces FS (shown through FIGS. 2A-2C). In some versions, the carrier assembly 148, the track assemblies 154, and/or other components and structural features of the patient transport apparatus 100 may be similar to those disclosed in U.S. Provisional Patent Application No. 62/954,951, previously referenced. Other configurations are contemplated.

Figure 3:
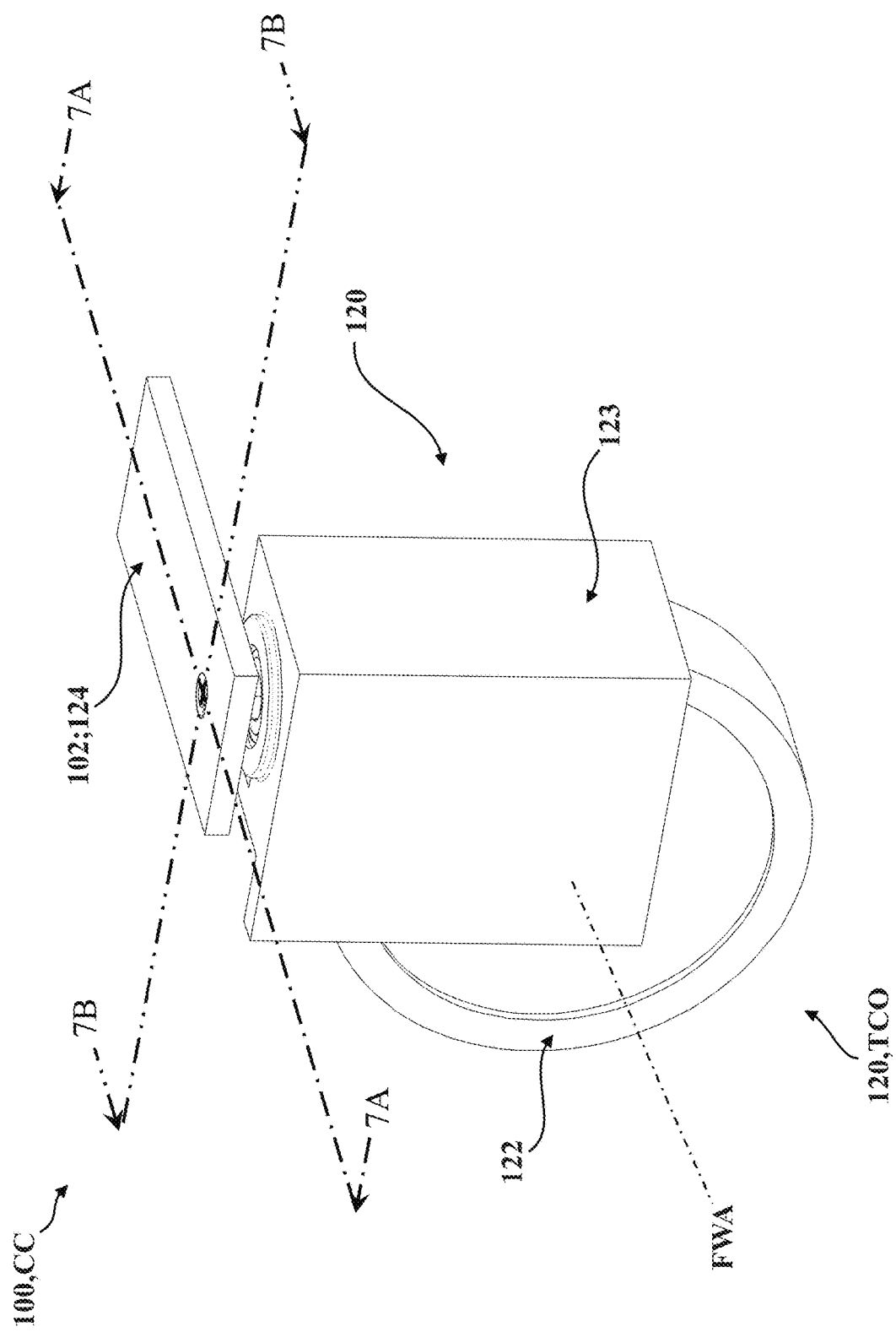
FIG. 3 is a perspective view of a caster assembly of the patient transport apparatus of FIGS. 1A-2D according to a first version of the present disclosure, shown having a caster frame arranged to pivot about a swivel axis and supporting a wheel, and depicted with the caster frame arranged in a transport caster orientation.
Figure 4:
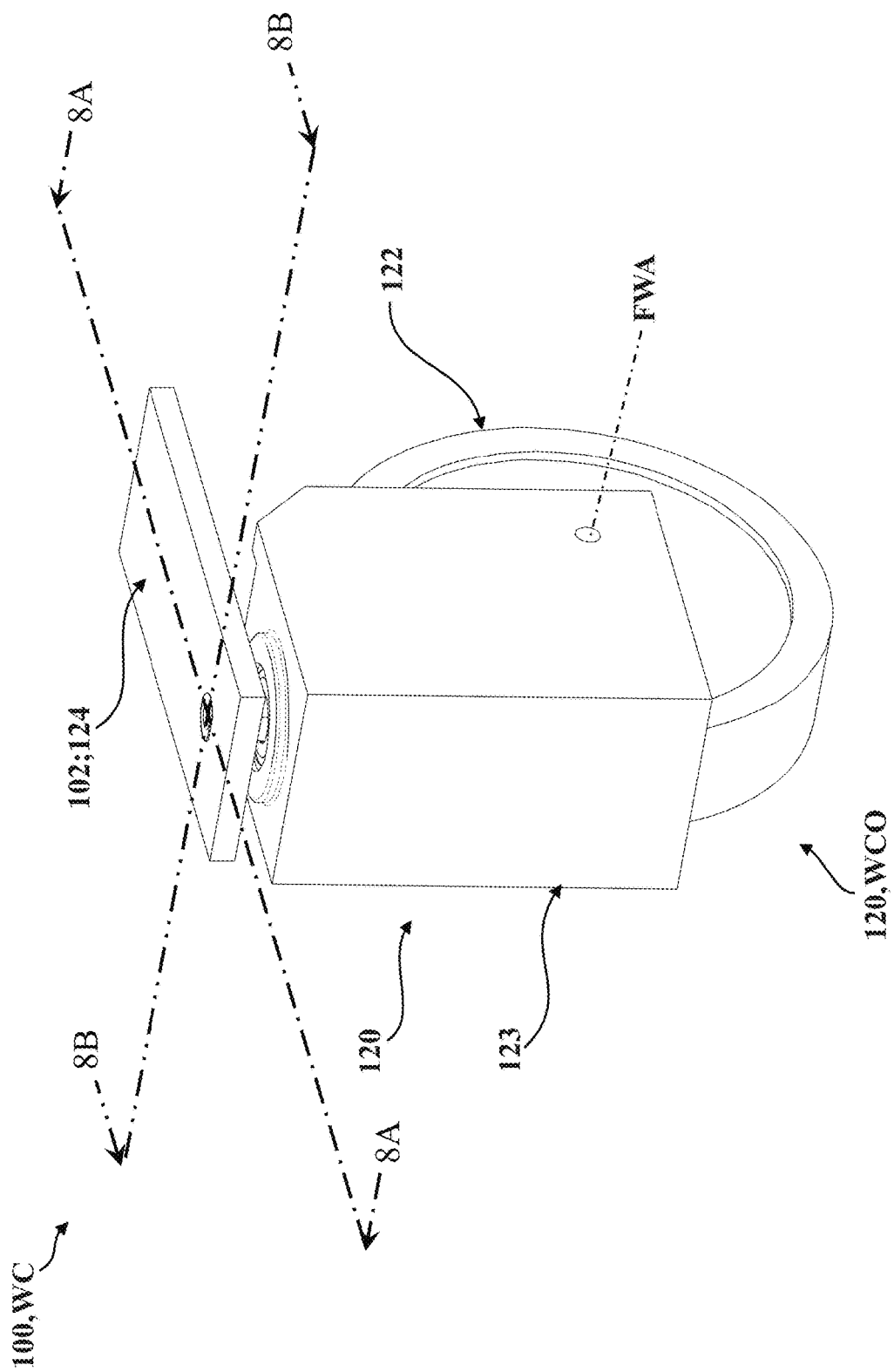
FIG. 4 is another perspective view of the caster assembly of FIG. 3, depicted with the caster frame arranged in a stowed caster orientation via a biasing mechanism.

Referring now to FIGS. 3-4, each caster frame 123 is arranged to pivot about its respective swivel axis SA between a plurality of caster orientations. As shown in FIG. 3, one of the caster frames 123 is shown arranged in an exemplary transport caster orientation TCO to permit the patient transport apparatus 100 to traverse floor FS when in the chair configuration CC. When operating in the chair configuration CC, the caster frame 123 and the front wheel 122 of each caster assembly 120 is free to rotate about the swivel axis SA between a plurality of different transport caster orientations TCO. In other words, the caster assembly 120 may freely rotate about the swivel axis SA as the direction the patient transport apparatus 100 travels in changes while transporting patients (e.g., to turn or steer the patient transport apparatus 100). Here too, additional bearings, washers, bushings, shafts, fasteners, and the like (not shown in detail) may be provided to facilitate pivoting motion of the caster frame 123 relative to the support structure 102. Similarly, additional bearings, washers, and/ or bushings (not shown in detail) may be provided to facilitate smooth rotation of the front wheels 122 about the front wheel axis FWA. Other configurations are contemplated.

As noted above, the patient transport apparatus 100 is configured to be operable in the stowed configuration WC for storage (e.g., in an ambulance, a closet, a room, and the like) when not being utilized to transport patients. When in the stowed configuration WC, the caster frame 123 is articulated to a stowed caster orientation WCO as shown in FIG. 4 which, among other things, allows the patient transport apparatus 100 to occupy an advantageously small footprint and fit better in storage areas. In order to help facilitate transitioning between the chair configuration CC (see FIG. 2A) and the stowed configuration WC (see FIG. 2C), each of the caster assemblies 120 also comprises a biasing mechanism 128 which urges the caster frame 123 from the transport caster orientation TCO toward the stowed caster orientation WCO in response to disengagement between the front wheel 122 and floor surfaces FS, which occurs as the support structure 102 moves from the chair configuration CC to the stowed configuration WC and the front wheel 122 lifts off the floor surface FS.

As the front wheel 122 disengages from the floor surface FS, the weight of the patient transport apparatus 100 is lifted off the caster assembly 120, and the biasing mechanism 128 urges the caster frame 123 about the swivel axis SA to the stowed caster orientation WCO so that the front wheel axis FWA intersects the first plane FP of the back section 106. Here, it will be appreciated that the caster assembly 120 is automatically biased into an orientation that is optimal for storage as the patient transport apparatus 100 transitions from the chair configuration CC to the stowed configuration WC. Thus, the patient transport apparatus 100 can be folded or otherwise collapsed into the stowed configuration WC while ensuring that the front wheels 122 do not protrude outwards, which ultimately provides for an optimized overall footprint, thereby helping ensure a consistent, optimal fit in storage areas.

Referring now to FIGS. 3-8B, the illustrated version of the caster assembly 120 includes a biasing mechanism 128 comprising a first magnetic element 130 operatively attached to the pin 121, and a second magnetic element 132 operatively attached to the caster frame 123 adjacent to the first magnetic element 130. The second magnetic element 132 is arranged in attractive magnetic relationship with the first magnetic element 130 so as to urge the caster frame 123 about the swivel axis SA and into the stowed caster orientation WCO (see FIG. 4) from any of the plurality of different transport caster orientations TCO (see FIG. 3). In the illustrated version, the biasing mechanism 128 also comprises a third magnetic element 134 operatively attached to the caster frame 123 adjacent to the first magnetic element 130. Like the second magnetic element 132, the third magnetic element 134 is also arranged in attractive magnetic relationship with the first magnetic element 130 to urge the caster frame 123 about the swivel axis SWA. More specifically, the second magnetic element 132 and the third magnetic element 134 are arranged in attractive magnetic relationship with the first magnetic element 130 so as to urge the caster frame 123 about the swivel axis SA and into the stowed caster orientation WCO (see FIG. 4) as the support structure 102 moves from the chair configuration CC (see FIG. 2A) to the stowed configuration WC (see FIG. 2C).

While the illustrated version of the biasing mechanism 128 illustrated in FIGS. 3-8B employs first, second, and third magnetic elements 130, 132, 134, it is contemplated that the biasing mechanism 128 may include other quantities of magnetic elements. For example, the biasing mechanism 128 may only comprise the first magnetic element 130 and the second magnetic element 132 in some versions. In another example, the biasing mechanism 128 may comprise more than three magnetic elements. Other configurations are contemplated. In the representative versions illustrated herein, the first, second, and third magnetic elements 130, 132, 134 each have a substantially cylindrical profile. However, other configurations are contemplated, and it will be appreciated that the first, second, and/or third magnetic elements 130, 132, 134 could be configured with various sizes, shapes, profiles, and the like.

Figure 5:
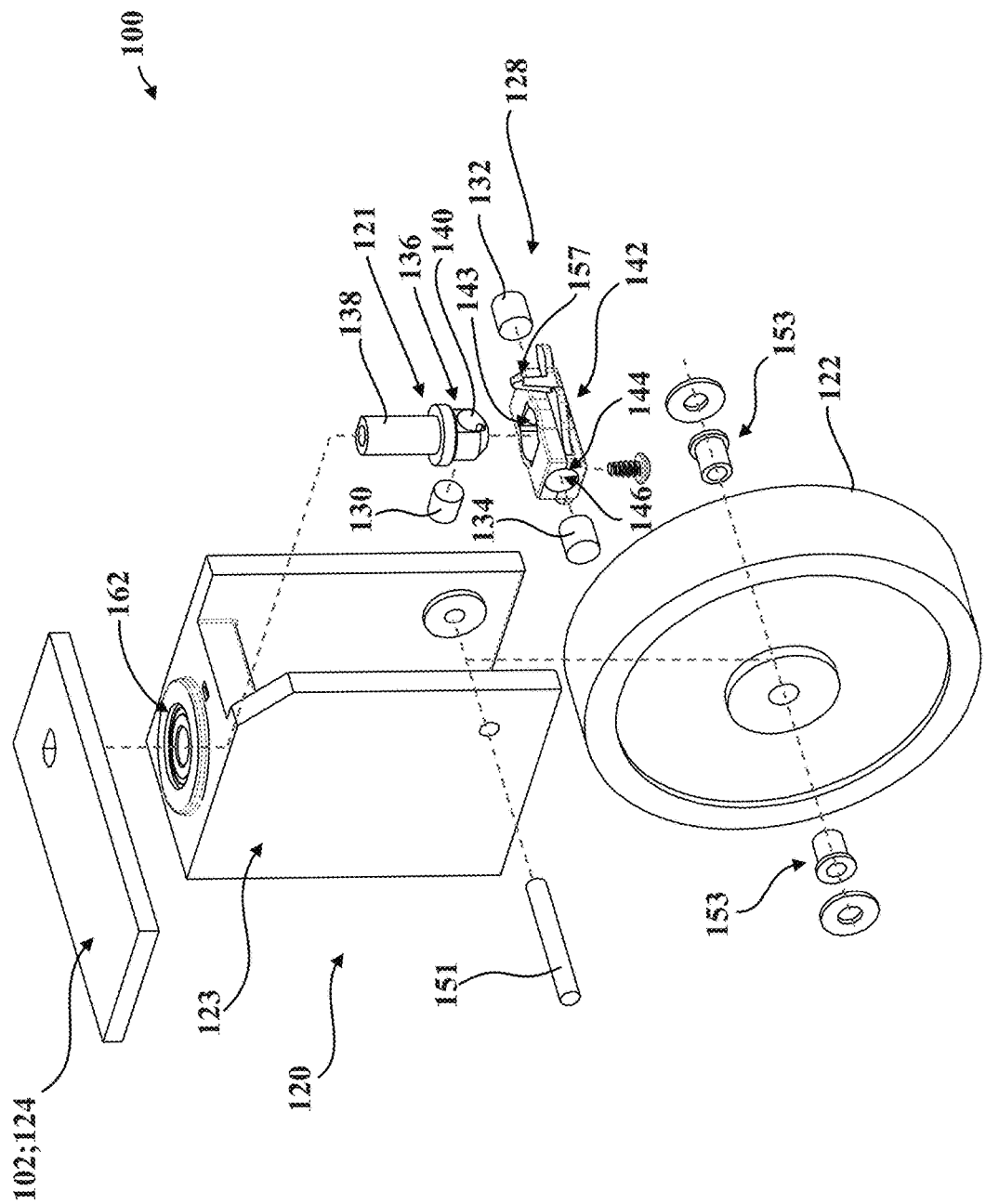
FIG. 5 is an exploded perspective view of the caster assembly of FIGS. 3-4, shown with the biasing mechanism including a pin comprising a carrier for supporting a first magnetic element, and a holder for supporting second and third magnetic elements.

As is best shown in FIG. 5, the pin 121 of the caster assembly 120 comprises a carrier 136 for supporting the first magnetic element 130, and a shank 138 extending from the carrier 136 along the swivel axis SWA. The shank 138 extends through the bearing 162 supported in or otherwise coupled to the caster frame 123 to facilitate rotation about the swivel axis SWA, and is operatively attached to the support structure 102 (e.g., to the lateral brace 124) for concurrent movement. Put differently, the pin 121 is fixed relative to the caster frame 123. The carrier 136 of the pin 121 defines a pin bore 140 formed extending transversely through the swivel axis SWA, which is shaped to receive the first magnetic element 130. In some versions, the first magnetic element 130 may be press-fit into the pin bore 140. However, other configurations are contemplated, and it will be appreciated that the first magnetic element 130 could be operatively attached to the pin 121 in a number of different ways. By way of non-limiting example, the first magnetic element 130 could be adhered to the pin 121 (e.g., using an epoxy or another suitable adhesive) within the pin bore 140. Other configurations are contemplated.

With continued reference to FIGS. 3-8B, in the illustrated version, the caster assembly 120 includes a holder 142 defining a seat 143 shaped to receive at least a portion of the carrier 136 of the pin 121 therein. The holder 142 comprises a retainer 144 disposed adjacent to the seat 143, and defines a retainer bore 146 shaped to receive the second magnetic element 132 therein. The holder 142 also defines a second retainer bore 147 shaped to receive the third magnetic element 134 therein. Here too, it will be appreciated that the second and/or third magnetic elements 132, 134 could be operatively attached to the holder 142 in a number of different ways. In use, the first magnetic element 130 is positioned between the second and third magnetic elements 132, 134 such that the first magnetic element 130 is arranged in magnetic relationship with each of the second and third magnetic elements 132, 134.

Figure 6:
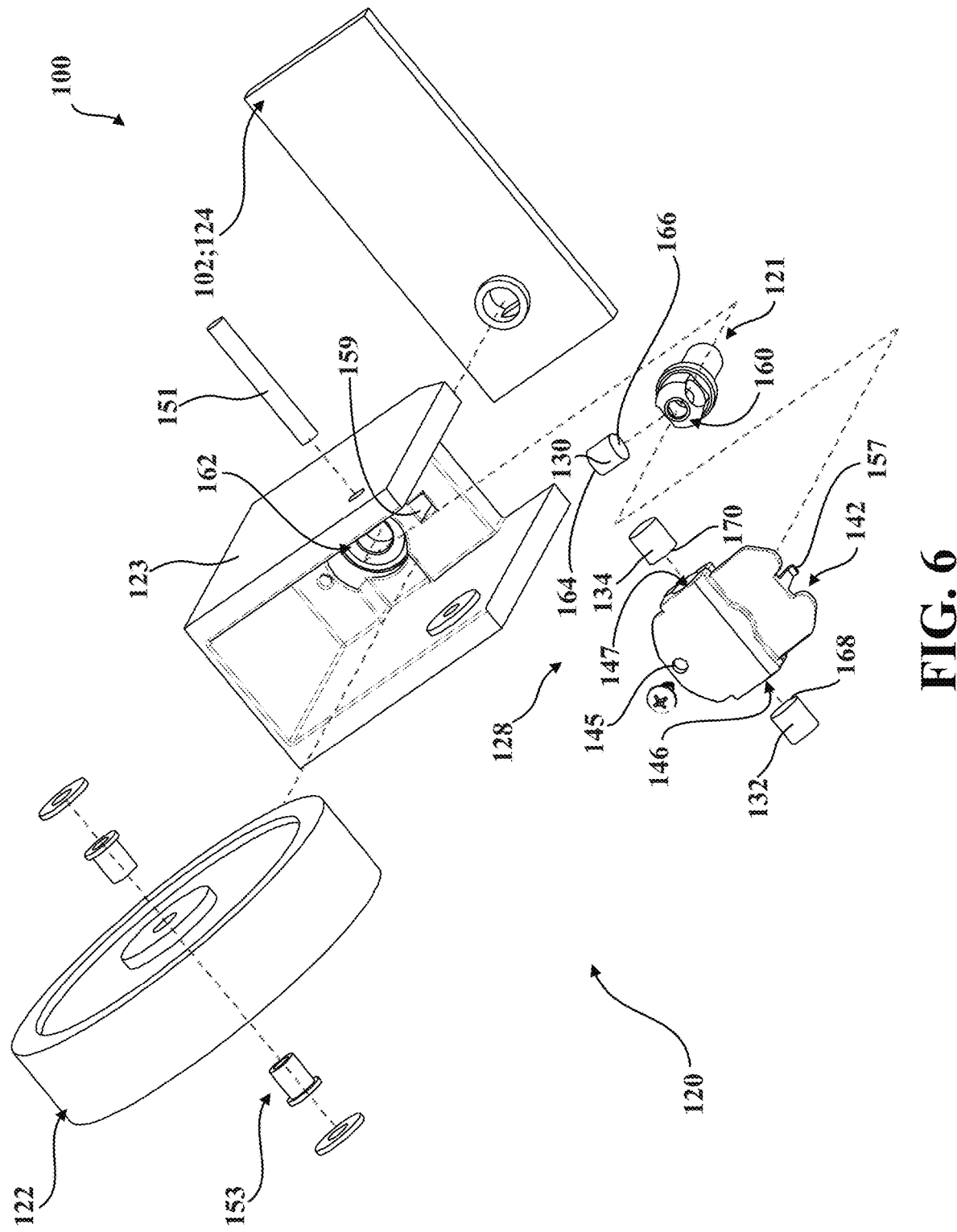
FIG. 6 is another exploded perspective view of the first version of the caster assembly of FIGS. 3-5.
Figure 7:
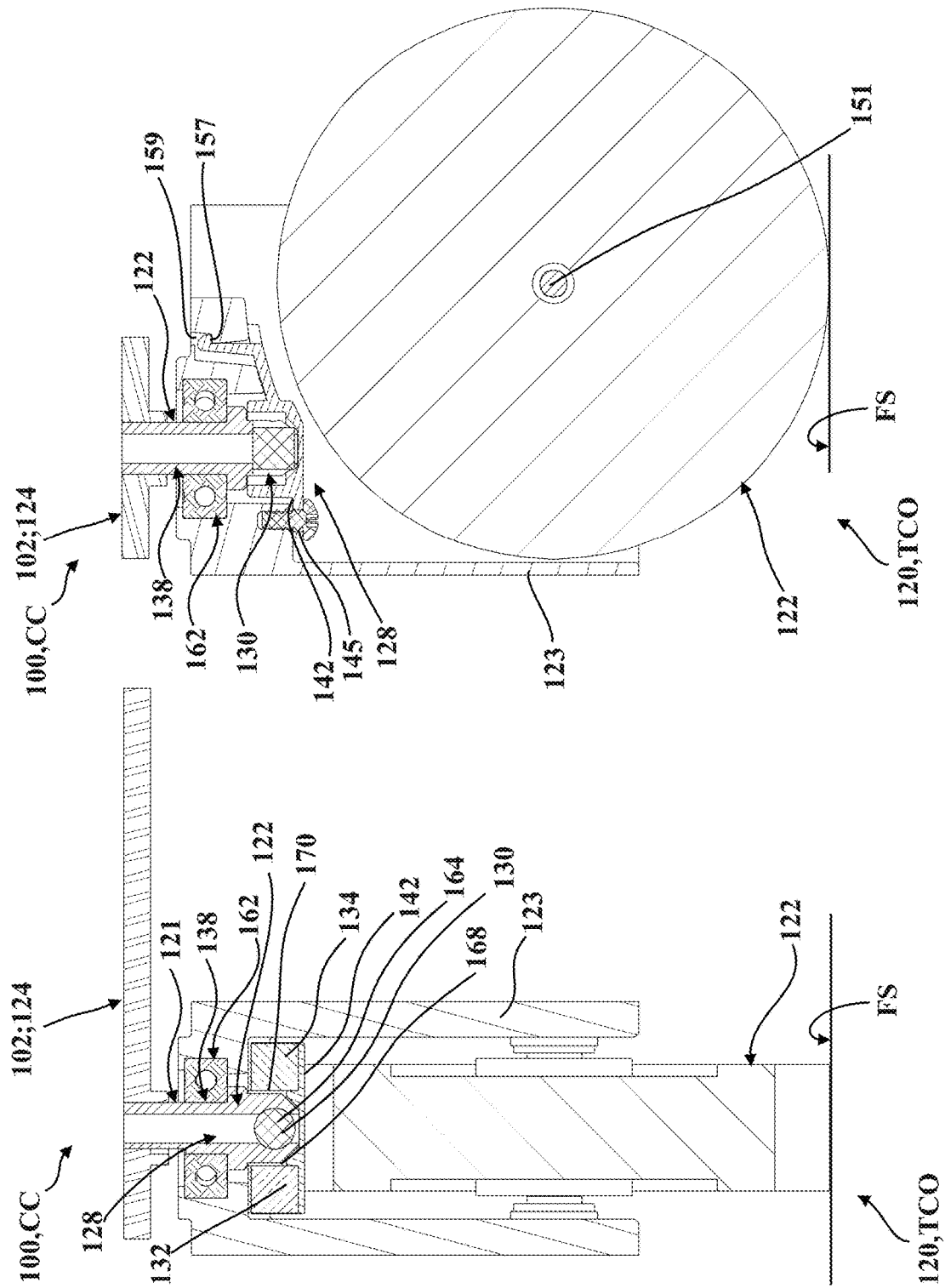
FIG. 7A is a sectional view taken along reference 7A-7A in FIG. 3.
FIG. 7B is a sectional view taken along reference 7B-7B in FIG. 3.
Figure 8:
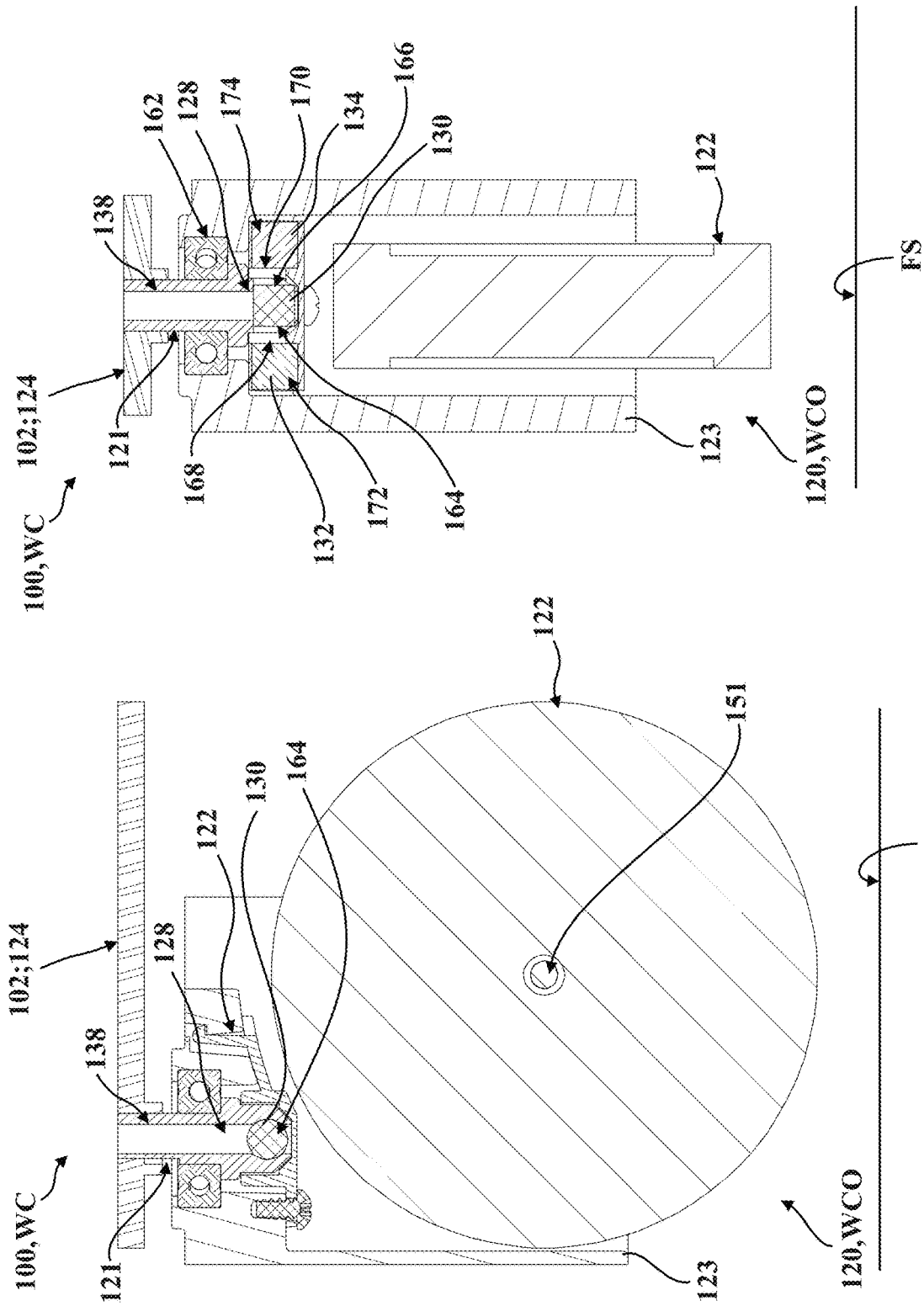
FIG. 8A is a sectional view taken along reference 8A-8A in FIG. 4.
FIG. 8B is a sectional view taken along reference 8B-8B in FIG. 4.

As best shown in FIG. 6, the holder 142 may be removably attachable to the caster frame 123. To this end, in the representative versions illustrated herein, the holder 142 comprises an aperture 145 and a resilient finger 157. Here, the resilient finger 157 is shaped to engage within a pocket 159 formed in the caster frame 123, and a fastener (not shown in detail) can be inserted through the aperture 145 to retain the holder 142 to the caster frame 123. However, it will be appreciated that other configurations are contemplated, and the holder 142 may be operatively attached to the caster frame 123 in a number of different ways. In some versions, the holder 142 could be formed integrally with the caster frame 123. It will be appreciated that the holder 142 may be formed as a unity component, or may be defined by multiple components operatively attached to each other. Other configurations are contemplated.

As noted above, when the patient transport apparatus 100 operates in the chair configuration CC (see FIGS. 1A and 2A), the front wheels 122 are in engagement with the floor surface FS. Here, the weight of the patient transport apparatus 100 acting on the front wheels 122, and the corresponding rotational force acting between the bearing 162 supported in the caster frame 123, and the pin 121 coupled to the lateral brace 124 of the support structure 102, is sufficient to overcome the magnetic forces occurring between the first, second, and third magnetic elements 130, 132, 134 to allow the caster frame 123 to be moved from the stowed caster orientation WCO to and between various transport caster orientations TCO. Thus, the caster assembly 120 may freely rotate about the swivel axis SA in response to changes in the direction the patient transport apparatus 100 travels along the floor surface FS.

In order to help promote rotation of the caster assembly 120 about the swivel axis SWA, as is best depicted in FIGS. 7A-7B, in some versions, the carrier 136 of the pin 121 may define a pilot face 160 shaped to engage the seat 143 of the holder 142 when the support structure 102 is disposed in the chair configuration CC for traversing floor surfaces FS. Here, both the pilot face 160 and the seat 143 have generally frustoconical profiles. In some versions, the pilot face 160 may remain spaced from the seat 143, or may be disposed in sliding contact (e.g., bearing contact) when the patient transport apparatus 100 operates in the chair configuration CC. Other configurations are contemplated.

As described in greater detail below in connection with FIGS. 8A-8B, when the patient transport apparatus 100 transitions from the chair configuration CC to the stowed configuration WC, the front wheels 122 disengage from the floor surface FS and the biasing mechanism 128 urges the caster frame 123 toward the stowed caster orientation WCO. More specifically, as weight is lifted off the caster assembly 120 resulting from the front wheels 122 disengaging from the floor surface FS, the magnetic forces acting between the first, second, and third magnetic elements 130, 132, 134 urge the caster frame 123 rotatably about the swivel axis SA from one of the transport caster orientations TCO toward the stowed caster orientation WCO at the same time that the support structure 102 moves from the chair configuration CC to the stowed configuration WC.

In some versions, the first magnetic element 130 operatively attached to the pin 121 defines a first pin pole 164 and an opposing second pin pole 166, the second magnetic element 132 defines a first frame pole 168, and the third magnetic element 134 defines a second frame pole 170. In the stowed caster orientation WCO, the first frame pole 168 is attracted to the first pin pole 164 of the first magnetic element 130, and the second frame pole 170 is attracted to the second pin pole 166 of the first magnetic element 130. The attractive magnetic relationship between the first, second, and third magnetic elements 130, 132, 134 pivots the caster frame 123 about the swivel axis SA from the transport caster orientation TCO to the stowed caster orientation WCO (compare FIGS. 3 and 4; magnetic relationship between the first, second, and third magnetic elements 130, 132, 134 not shown in detail). Here, the second magnetic element 132 further defines a first reference pole 172 which opposes the first pin pole 164 of the first magnetic element 130, and the third magnetic element 134 further defines a second reference pole 174 which is attracted to the first pin pole 164 of the first magnetic element 130. While the second and third magnetic elements 132, 134 are each arranged so as to be attracted toward the first magnetic element 130 to bias the caster frame 123 toward the stowed caster orientation WCO in the representative version illustrated herein, it will be appreciated that other configurations are contemplated. By way of non-limiting example, it is contemplated that one or more of second and third magnetic elements 132, 134 could be arranged in other ways, such as to at least partially repel the first magnetic element 130 in some orientations. Other configurations are contemplated.

Figure 9:
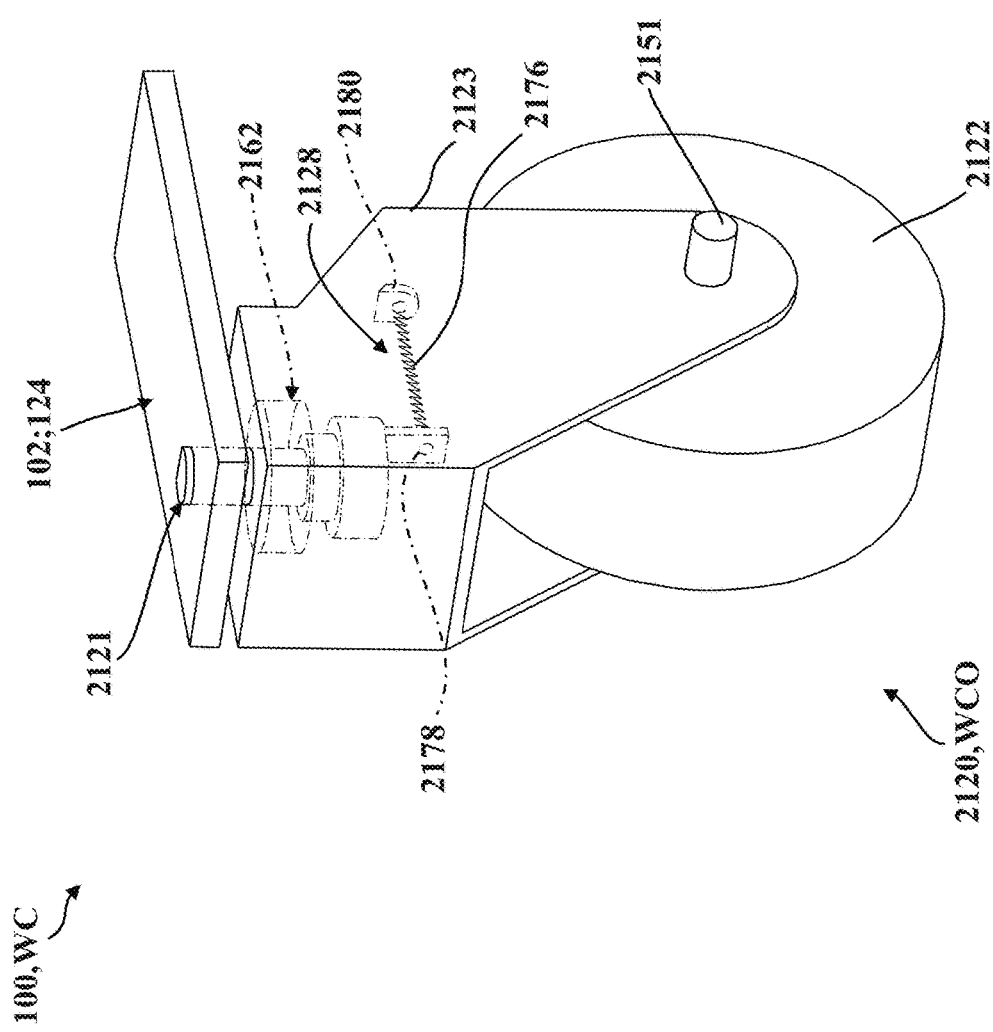
FIG. 9 is a perspective view of a caster assembly of the patient transport apparatus of FIGS. 1A-2D according to a second version of the present disclosure, shown having a caster frame arranged to pivot about a swivel axis and supporting a wheel, depicted with the caster frame arranged in a stowed caster orientation via a biasing mechanism comprising a first spring mount formed on the pin, a second spring mount formed on the caster frame, and a spring arranged extending between the first and second spring mounts.
Figure 10:
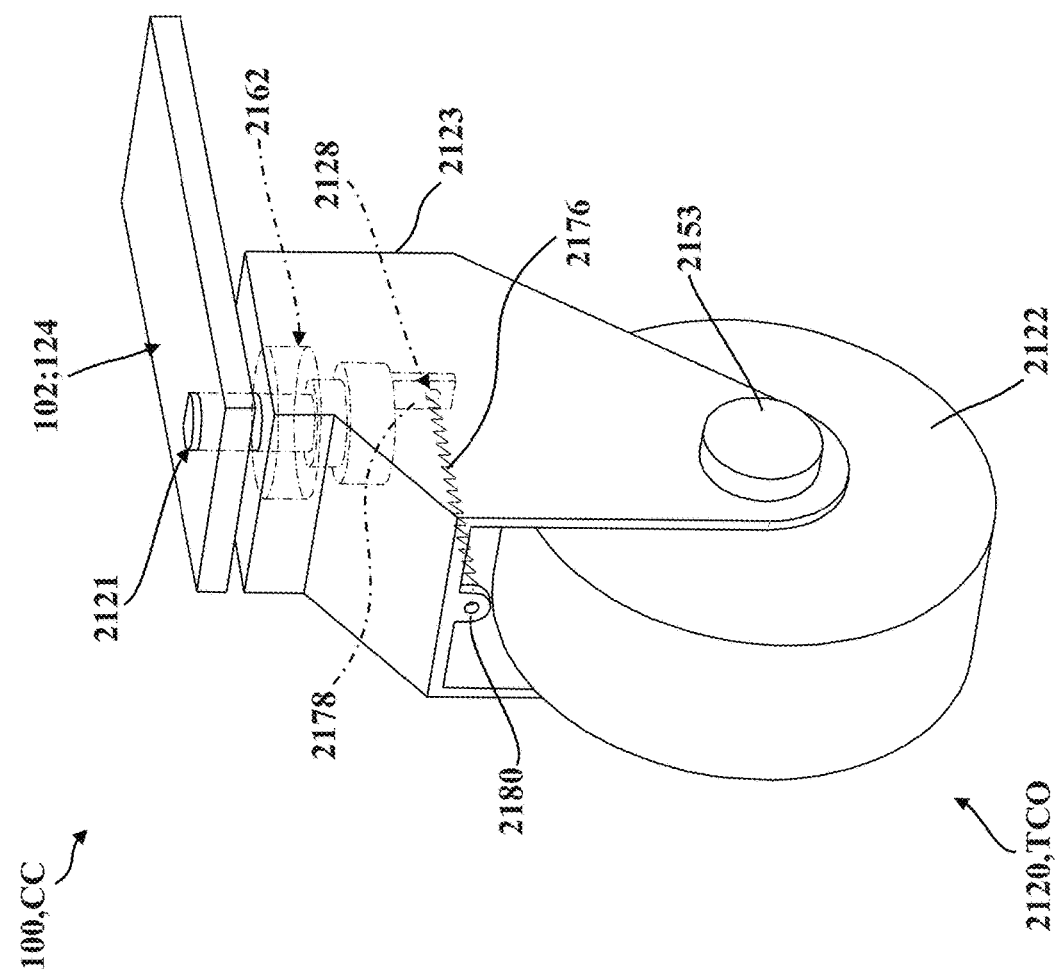
FIG. 10 is another perspective view of the second version of the caster assembly of FIG. 9, depicted with the caster frame arranged in a transport caster orientation, and with the spring of the biasing mechanism extending between the first spring mount of the pin and the second spring mount of the caster frame.
Figure 11:
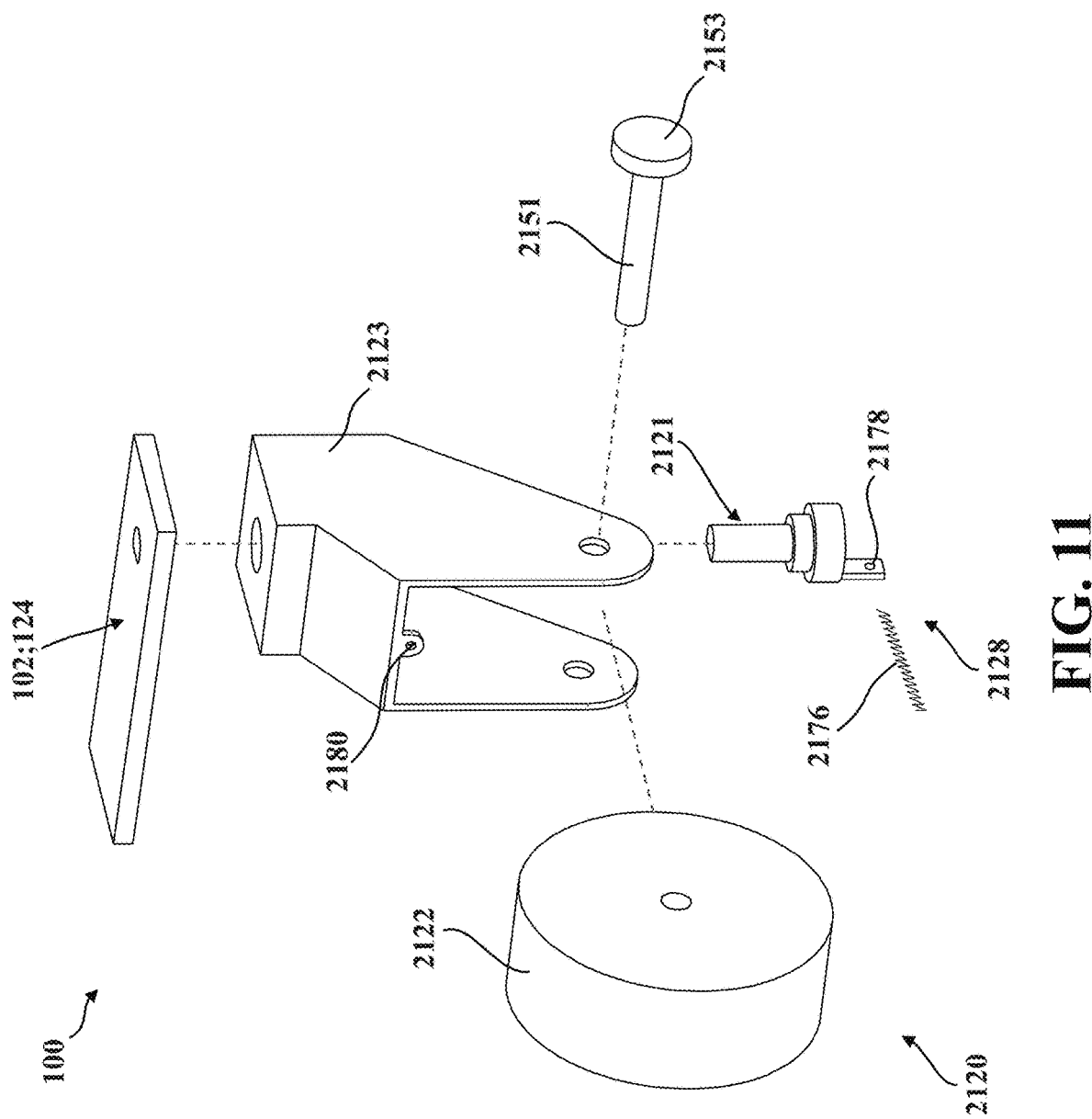
FIG. 11 is an exploded perspective view of the second version of the caster assembly of FIGS. 9-10.
Figure 12:
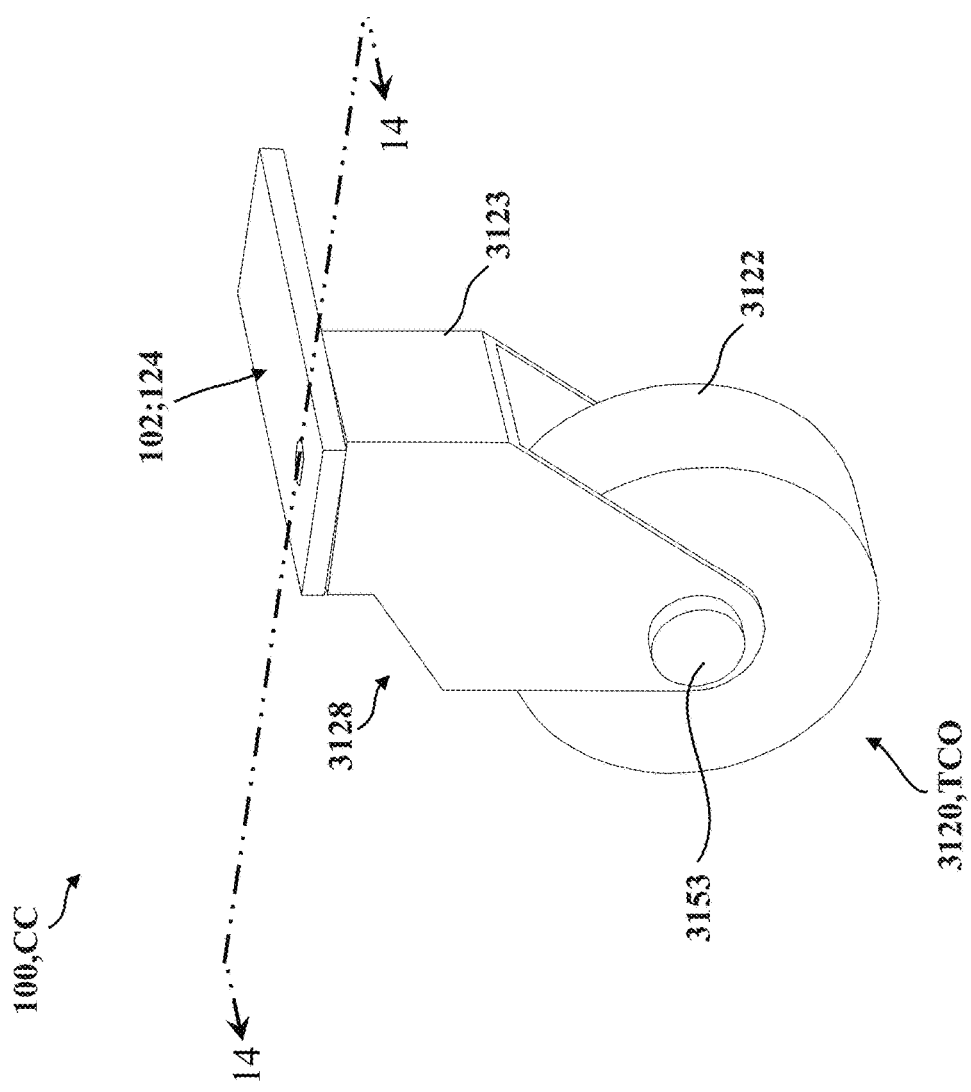
FIG. 12 is a perspective view of a caster assembly of the patient transport apparatus of FIGS. 1A-2D according to a third version of the present disclosure, shown having a caster frame arranged to pivot about a swivel axis and supporting a wheel, depicted with the caster frame arranged in a transport caster orientation.
Figure 13:
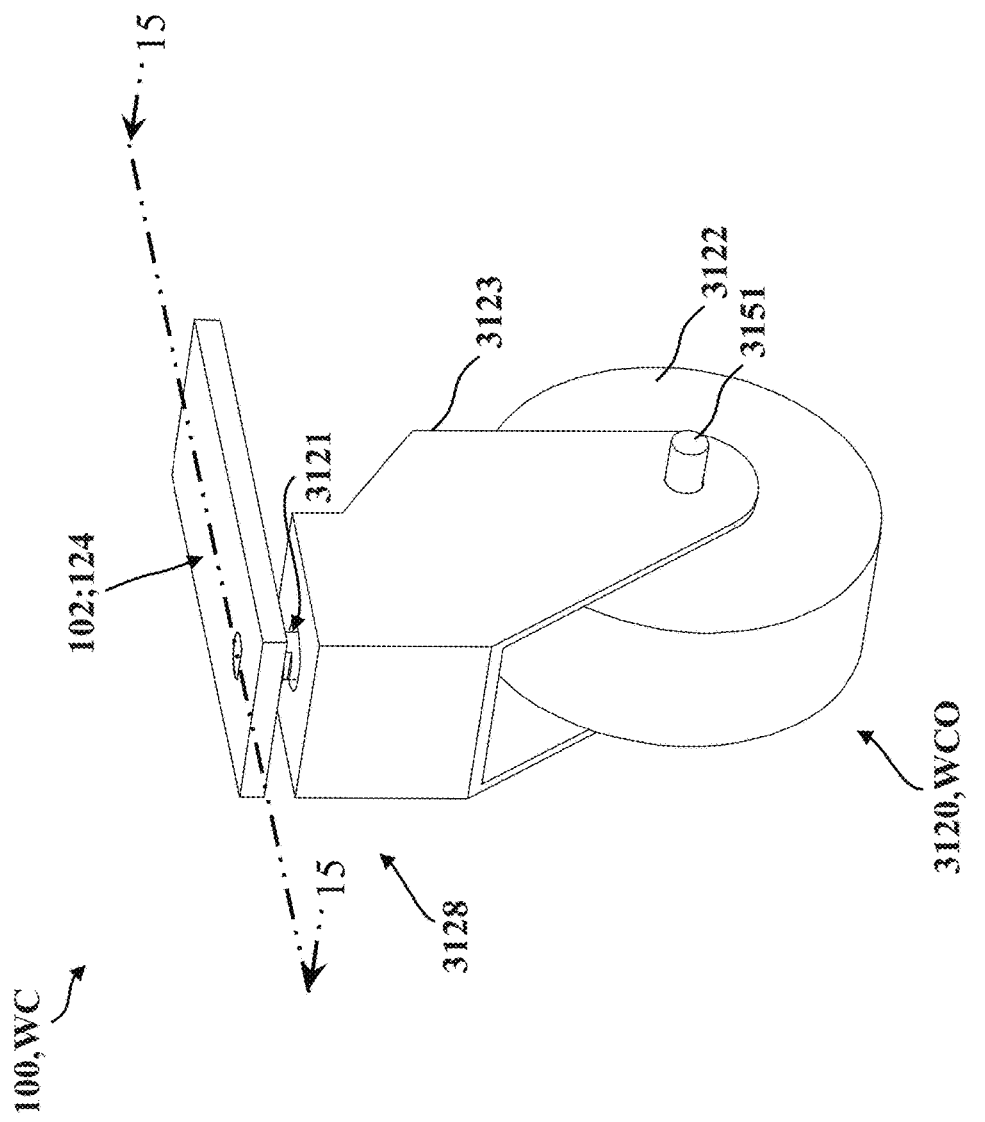
FIG. 13 is another perspective view of the third version of the caster assembly of FIG. 12, depicted with the caster frame arranged in a stowed caster orientation.

As noted above, a second version of the caster assembly of the patient transport apparatus 100 is shown in FIGS. 9-11. In the description that follows, the structure and components of the second version that are the same as or that otherwise correspond to the structure and components of the first version of the caster assembly 120 are provided with the same reference numerals increased by 2000. Because many of the components and features of the second version of the caster assembly 2120 are substantially similar to those of the first version of the caster assembly 120 described above, for the purposes of clarity, consistency, and brevity, only certain specific differences between the second version of the caster assembly 2120 and the first version of the caster assembly 120 will be described below, and only some of the components and features common between the versions will be discussed herein and depicted in the drawings. Thus, unless otherwise indicated below, the description of the first version of the caster assembly 120 may be incorporated by reference with respect to the second version of the caster assembly 2120 without limitation.

Referring now to FIGS. 9-11, the second version of the caster assembly 2120 is shown. In this second version, the biasing mechanism 2128 comprises a biasing element realized as an extension spring 2176. Here, the extension spring 2176 is arranged so as to urge the caster frame 2123 from any of the transport caster orientations TCO (see FIG. 10) toward the stowed caster orientation WCO (see FIG. 9) when the support structure 102 moves from the chair configuration CC to the stowed configuration WC.

Here too in this version, the caster assembly 2120 employs the pin 2121 coupled to the support structure 102 for concurrent movement to define the swivel axis SA and rotatably support the caster frame 2123 for pivoting movement about the swivel axis SA via the bearing 2162. However, in this second version of the caster assembly 2120, the pin 2121 comprises a first spring mount 2178, and the caster frame 2123 comprises a second spring mount 2180. Here, the first spring mount 2178 is realized as a projection extending downwardly in a direction substantially parallel to the swivel axis SWA, with an aperture shaped to receive and retain one end of the extension spring 2176 (not shown in detail). Similarly, the second spring mount 2180 is realized as a projection formed on the caster frame 2123 that is likewise provided with an aperture shaped to receive and retain another end of the extension spring 2176 (not shown in detail). As shown in FIGS. 9 and 10, the extension spring 2176 extends between the first spring mount 2178 and the second spring mount 2180.

The extension spring 2176 length increases as the caster frame 2123 transitions from the stowed caster orientation WCO (see FIG. 9) to the transport caster orientation TCO (see FIG. 10). Here, the weight of the patient transport apparatus 100 acting on the front wheels 2122, and the corresponding rotational force acting between the bearing 2162 supported in the caster frame 2123, and the pin 2121 coupled to the lateral brace 124 of the support structure 102, is sufficient to overcome the biasing force exerted by the extension spring 2176 to allow the caster frame 2123 to be moved from the stowed caster orientation WCO to and between various transport caster orientations TCO. The extension spring 2176 length decreases as the caster frame 2123 transitions from the transport caster orientation TCO to the stowed caster orientation WCO. As the front wheel 2122 disengages from the floor surface FS, the biasing force exerted by the extension spring 2176 urges the caster frame 2123 about the swivel axis SA toward the stowed caster orientation WCO.

As noted above, a third version of the caster assembly of the patient transport apparatus 100 is shown in FIGS. 12-17. In the description that follows, the structure and components of the third version that are the same as or that otherwise correspond to the structure and components of the first version of the caster assembly 120 are provided with the same reference numerals increased by 3000. Because many of the components and features of the third version of the caster assembly 3120 are substantially similar to those of the first version of the caster assembly 120 described above, for the purposes of clarity, consistency, and brevity, only certain specific differences between the third version of the caster assembly 3120 and the first version of the caster assembly 120 will be described below, and only some of the components and features common between the versions will be discussed herein and depicted in the drawings. Thus, unless otherwise indicated below, the description of the first version of the caster assembly 120 may be incorporated by reference with respect to the third version of the caster assembly 3120 without limitation.

Referring now to FIGS. 12-17, the third version of the caster assembly 3120 is shown. Here too in this version, the caster assembly 3120 employs the pin 3121 coupled to the support structure 102 for concurrent movement to define the swivel axis SA and rotatably support the caster frame 3123 for pivoting movement about the swivel axis SA via the bearing 3162. However, in this version, the caster frame 3123 and the front wheel 3122 (as well as other components coupled thereto) are arranged for translation along the shank 3138 of the pin 3121. More specifically, the bearing 3162 coupled to the caster frame 3123 is disposed in sliding contact with the shank 3138. With this configuration, when the front wheels 3122 disengage from the floor surface FS, the caster assembly 3120 "falls" relative to the support structure 102 and, at the same time, moves towards the stowed caster orientation WCO via operation of the biasing mechanism 3128. To this end, the biasing mechanism 3128 in the third version of the caster assembly 3120 comprises portions of the pin 3121 and the caster frame 3123 which engage each other. As is described in greater detail below, in this version, the pin 3121 comprises a guide body 3182 operatively attached to the shank 3138 which defines a ramp surface 3184, and a follower 3186 operatively attached to the caster frame 3123 is arranged to engage the ramp surface 3184 of the guide body 3182 to urge the caster assembly 3120 toward the stowed caster orientation WCO when the patient transport apparatus 100 transitions out of the chair configuration CC toward the stowed configuration WC. Put differently, and as is best shown in FIGS. 14-15, as the front wheel 3122 disengages from the floor surfaces FS and weight is lifted off of the caster assembly 3120, the caster assembly 3120 "falls" downwards along the swivel axis SA and travels along the shank 3138 of the pin 3121 to bring the follower 3186 into engagement with the ramp surface 3814 which, in turn, urges the caster frame 3123 toward the stowed caster orientation WCO as described in greater detail below. While gravity is utilized to facilitate the "falling" motion in the representative version illustrated herein, it will be appreciated that, in some versions, the caster assembly 3120 may include a spring (not shown) positioned between the caster frame 3123 and the support structure 102 that is configured to urge the caster frame 3123 away from the support structure 102. However, other configurations are contemplated.

Figure 16:
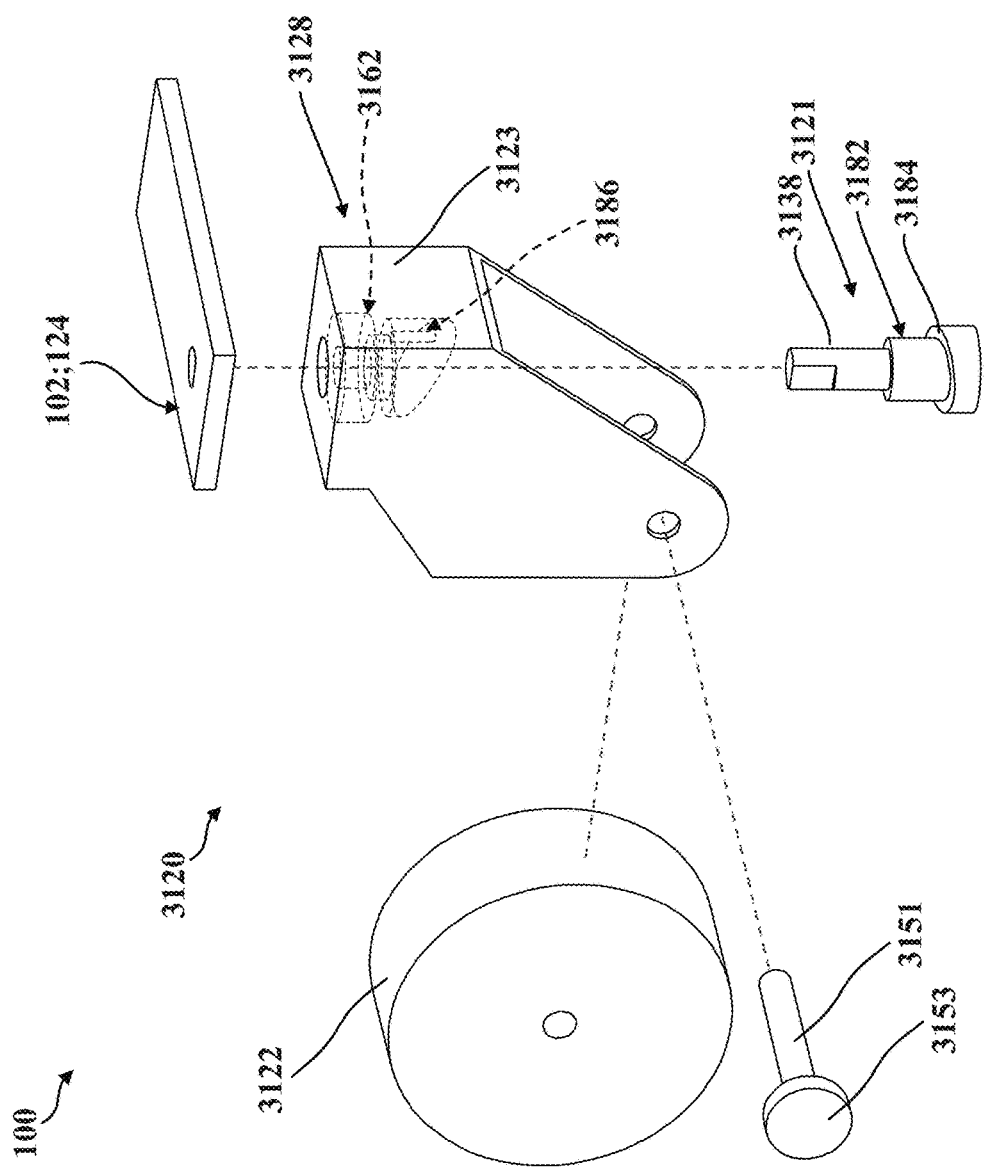
FIG. 16 is an exploded perspective view of the third version of the caster assembly of FIGS. 12-15, shown having a biasing mechanism including a follower formed on the caster frame and arranged to engage a ramp surface formed on a pin.
Figure 17:
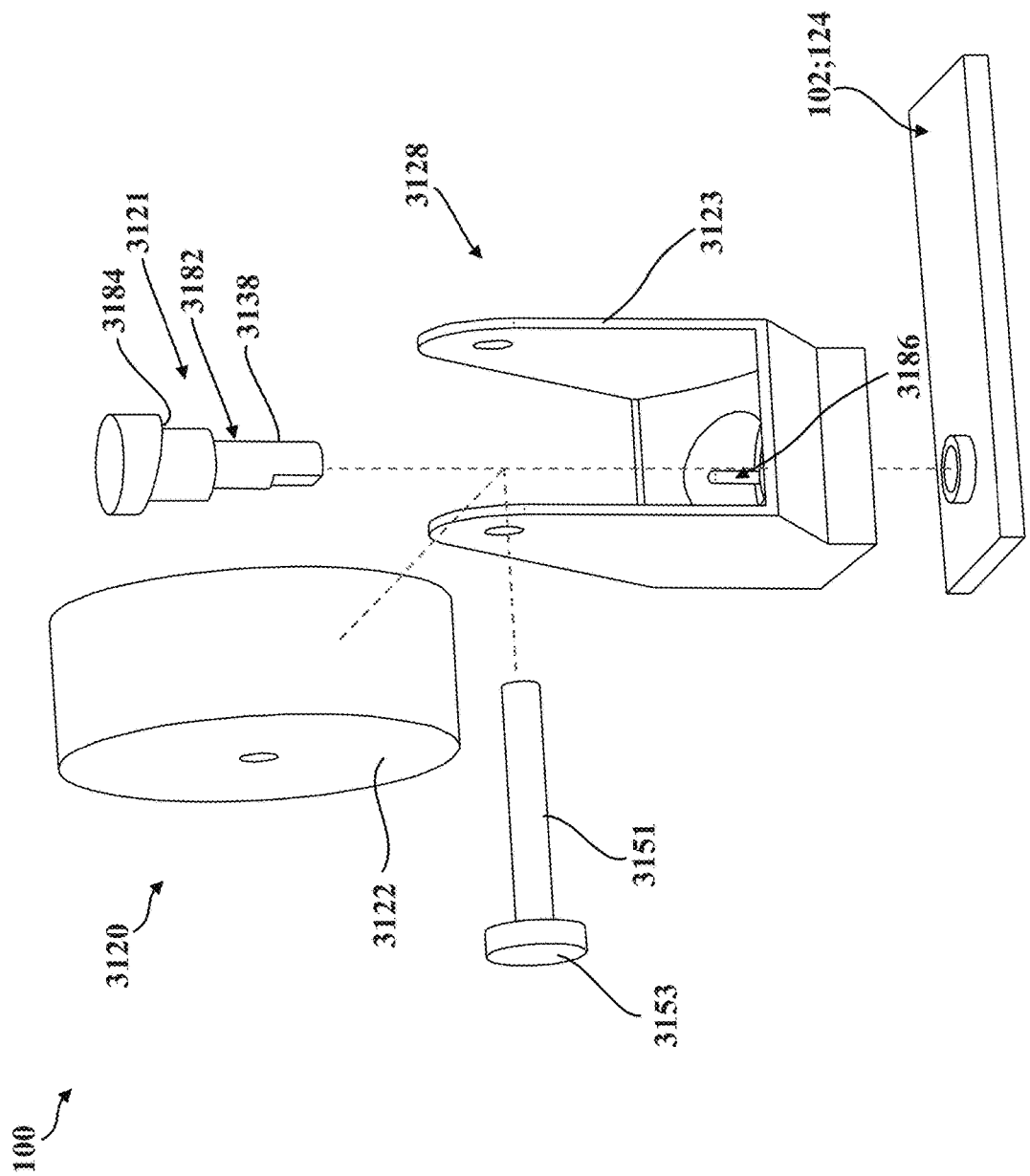
FIG. 17 is another exploded perspective view of the third version of the caster assembly of FIGS. 12-16.

As is best shown in FIGS. 16-17, as noted above, the pin 3121 of the caster assembly 3120 comprises the guide body 3182 defining the ramp surface 3184, and the follower 3186 coupled to the caster frame 3123 cooperates with the ramp surface 3184 to serve as the biasing mechanism 3128 in this third version of the caster assembly 3120. In the illustrated version, the ramp surface 3184 is formed in (or otherwise defined by) the guide body 3182 extending at least partially helically around the swivel axis SWA, and faces generally towards the support structure 102. The follower 3186 is operatively attached to the caster frame 3123, and is disposed in sliding contact with the ramp surface 3184 of the guide body 3182 of the pin 3121. The follower 3186 has a generally cylindrical profile which extends away from the support structure 102 to a rounded end (not shown in detail) that engages against the ramp surface 3184. Here, the follower 3186 extends generally parallel to, but is offset from, the swivel axis SWA. Those having ordinary skill in the art will appreciate that both the follower 3186 and the ramp surface 3184 could be provided with other shapes, profiles, configurations, and the like sufficient to engage each other to urge the caster frame 3123 toward the stowed caster orientation WCO when the patient transport apparatus 100 transitions out of the chair configuration CC toward the stowed configuration WC.

As is best depicted in FIG. 14, when the patient transport apparatus 100 operates in the chair configuration CC, the ramp surface 3184 of the biasing mechanism 3128 is disengaged from the follower 3186, allowing the caster frame 3123 to pivot about the swivel axis SA between various transport caster orientations TCO. When the front wheel 3122 disengages from the floor surface FS, the bearing 3162 travels at least partially along the shank 3138 of the pin 3121 to bring the follower 3186 into engagement with the ramp surface 3184 of the guide body 3182 of the pin 3121 (compare FIGS. 14 and 15). Here, the ramp surface 3184 is shaped and arranged so as to urge the caster frame 3123 about the swivel axis SA toward the stowed caster orientation WCO as the support structure 102 moves from the chair configuration CC to the stowed configuration WC.

Those having ordinary skill in the art will appreciate that aspects of the first, second, and/or third versions of the caster assembly 120, 2120, 3120 can be combined or otherwise interchanged in order to bias the caster frame 123, 2123, 3123 toward the stowed caster orientation WCO in response to disengagement occurring between the front wheel 122 and the floor surface FS. Here, it will be appreciated that the movement of the caster frame 123 relative to the support structure 102 when transitioning from the chair configuration CC to the stowed configuration WC affords significant improvements in storability of the patient transport apparatus 100 by, among other things, ensuring that the overall footprint is consistent and minimized. More specifically, the versions of the biasing mechanisms 128, 2128, 3128 of the caster assemblies 120, 2120, 3120 disclosed herein ensure that the front wheels 122, 2122, 3122 and the caster frames 123, 2123, 3123 are automatically articulated to the stowed caster orientation WCO as the patient transport apparatus 100 transitions from the chair configuration CC to the stowed configuration WC. Moreover, it will be appreciated that the biasing mechanisms 128, 2128, 3128 are configured to permit movement of the caster frames 123, 2123, 3123 about the swivel axis SA between various transport caster orientations TCO when the patient transport apparatus 100 is utilized in the chair configuration CC.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

The present disclosure also comprises the following clauses, with specific features laid out in dependent clauses, that may specifically be implemented as described in greater detail with reference to the configurations and drawings above.

Clauses

I. A patient transport apparatus comprising:
a support structure movable between a chair configuration for traversing floor surfaces and a stowed configuration for storage;
a seat section for supporting the patient, the seat section being pivotably coupled to the support structure; and
a caster assembly comprising:
a pin coupled to the support structure for concurrent movement between the chair configuration and the stowed configuration, the pin defining a swivel axis;
a caster frame arranged to pivot about the swivel axis between a plurality of caster orientations including a stowed caster orientation,
a wheel coupled to the caster frame, supported for rotation about a wheel axis, and arranged for engagement with floor surfaces when the support structure is in the chair configuration, and
a biasing mechanism interposed between the caster frame and the pin to urge the caster frame toward the stowed caster orientation in response to disengagement between the wheel and floor surfaces occurring as the support structure moves from the chair configuration to the stowed configuration.

II. The patient transport apparatus as set forth in clause I, wherein the biasing mechanism comprises a first magnetic element operatively attached to the pin, and a second magnetic element operatively attached to the caster frame adjacent to the first magnetic element, the second magnetic element being arranged in magnetic relationship with the first magnetic element to urge the caster frame about the swivel axis toward the stowed caster orientation as the support structure moves from the chair configuration to the stowed configuration.

III. The patient transport apparatus as set forth in clause II, wherein the biasing mechanism further comprises a third magnetic element operatively attached to the caster frame adjacent to the first magnetic element, the third magnetic element being arranged in magnetic relationship with the first magnetic element to urge the caster frame about the swivel axis toward the stowed caster orientation as the support structure moves from the chair configuration to the stowed configuration.

IV. The patient transport apparatus as set forth in clause III, wherein the first magnetic element is positioned between the second magnetic element and the third magnetic element.

V. The patient transport apparatus as set forth in any of clauses III-IV, wherein the first magnetic element defines a first pin pole and an opposing second pin pole;
wherein the second magnetic element defines a first frame pole attracted to the first pin pole; and
wherein the third magnetic element defines a second frame pole attracted to the second pin pole.

VI. The patient transport apparatus as set forth in clause V, wherein the second magnetic element further defines a first reference pole opposing the first pin pole; and
wherein the third magnetic element further defines a second reference pole attracted to the first pin pole.

VII. The patient transport apparatus as set forth in any of clauses II-VI, wherein the pin of the caster assembly comprises a carrier supporting the first magnetic element, and a shank extending from the carrier along the swivel axis, the shank being coupled to the support structure.

VIII. The patient transport apparatus as set forth in clause VII, wherein the pin defines a pin bore formed extending transversely through the swivel axis and shaped to receive the first magnetic element.

IX. The patient transport apparatus as set forth in any of clauses VII-VIII, wherein the caster assembly comprises a bearing operatively attached to the caster frame and disposed along the shank of the pin adjacent to the carrier to support the caster frame for pivoting about the swivel axis.

X. The patient transport apparatus as set forth in clause IX, further comprising a holder operatively attached to the caster frame for supporting the second magnetic element, the holder defining a seat shaped to receive at least a portion of the carrier of the pin.

XI. The patient transport apparatus as set forth in clause X, wherein the holder comprises a retainer disposed adjacent to the seat and defining a retainer bore shaped to receive the second magnetic element.

XII. The patient transport apparatus as set forth in clause XI, wherein the carrier of the pin defines a pilot face shaped to engage the seat of the holder when the support structure is disposed in the chair configuration for traversing floor surfaces; and
wherein engagement between the pilot face and the seat results in at least partially resists rotation of the caster frame about the swivel axis to overcome magnetic attraction occurring between the first and second magnetic elements of the biasing mechanism.

XIII. The patient transport apparatus as set forth in clause I, wherein the biasing mechanism comprises a spring extending between the pin and the caster frame to urge the caster frame about the swivel axis toward the stowed caster orientation as the support structure moves from the chair configuration to the stowed configuration.

XIV. The patient transport apparatus as set forth in clause XIII, wherein the spring of the biasing mechanism is further defined as an extension spring; and
wherein the pin of the caster assembly comprises a first spring mount, the caster frame comprises a second spring mount, and the extension spring extends between each of the first and second spring mounts.

XV. The patient transport apparatus as set forth in any of clauses I-XIV, wherein the pin of the caster assembly comprises a guide body defining a ramp surface, and a shank extending from the guide body along the swivel axis, the shank being coupled to the support structure.

XVI. The patient transport apparatus as set forth in clause XV, wherein the caster assembly comprises a bearing operatively attached to the caster frame and disposed along the shank of the pin adjacent to the guide body to support the caster frame for pivoting about the swivel axis.

XVII. The patient transport apparatus as set forth in clause XVI, wherein the biasing mechanism comprises a follower operatively attached to the caster frame and disposed in sliding contact with the ramp surface of the guide body of the pin to urge the caster frame about the swivel axis toward the stowed caster orientation as the support structure moves from the chair configuration to the stowed configuration.

XVIII. The patient transport apparatus as set forth in clause XVII, wherein the ramp surface of the guide body of the pin extends at least partially helically around the swivel axis and is arranged to disengage from the follower when the support structure operates in the chair configuration.

XIX. The patient transport apparatus as set forth in any of clauses XVII-XVIII, wherein the bearing travels at least partially along the shank of the pin to bring the follower into engagement with the ramp surface of the guide body when the support structure moves from the chair configuration to the stowed configuration.

XX. The patient transport apparatus as set forth in any of clauses I-XIX, further comprising a rear wheel operatively attached to the support structure, spaced from the caster assembly, and configured to remain in engagement with the floor surfaces as the support structure moves from the chair configuration to the stowed configuration.

XXI. The patient transport apparatus as set forth in any of clauses I-XX, further comprising a back section for supporting the patient, the back section being operatively attached to the support structure and defining a first plane;
wherein the seat section defines a second plane arranged at a seat angle relative to the first plane; and
wherein the seat angle increases as the support structure moves from the stowed configuration to the chair configuration.

XXII. The patient transport apparatus as set forth in clause XXI, wherein the wheel axis intersects the first plane of the back section in the stowed caster orientation.

What is claimed is:
1. A patient transport apparatus comprising:
a support structure movable between a support configuration for traversing floor surfaces and a stowed configuration for storage; and
a caster assembly operatively attached to the support structure for concurrent movement between the support configuration and the stowed configuration, the caster assembly including:
a caster frame arranged for pivoting movement relative to the support structure between a plurality of caster orientations including a stowed caster orientation,
a wheel coupled to the caster frame and arranged for engagement with floor surfaces when the support structure is in the support configuration, and
a biasing mechanism interposed between the caster frame and the support structure to urge the caster frame toward the stowed caster orientation in response to disengagement between the wheel and floor surfaces occurring as the support structure moves from the support configuration to the stowed configuration.

2. The patient transport apparatus as set forth in claim 1, wherein the biasing mechanism comprises a first magnetic element operatively attached to the support structure, and a second magnetic element operatively attached to the caster frame adjacent to the first magnetic element, the second magnetic element being arranged in magnetic relationship with the first magnetic element to urge the caster frame to pivot toward the stowed caster orientation as the support structure moves from the support configuration to the stowed configuration.

3. The patient transport apparatus as set forth in claim 2, wherein the biasing mechanism further comprises a third magnetic element operatively attached to the caster frame adjacent to the first magnetic element, the third magnetic element being arranged in magnetic relationship with the first magnetic element to urge the caster frame to pivot toward the stowed caster orientation as the support structure moves from the support configuration to the stowed configuration.

4. The patient transport apparatus as set forth in claim 3, wherein the first magnetic element is positioned between the second magnetic element and the third magnetic element.

5. The patient transport apparatus as set forth in claim 3, wherein the first magnetic element defines a first pole and an opposing second pole;
wherein the second magnetic element defines a first frame pole attracted to the first pole;
wherein the third magnetic element defines a second frame pole attracted to the second pole;
wherein the second magnetic element further defines a first reference pole opposing the first pole; and
wherein the third magnetic element further defines a second reference pole attracted to the first pole.

6. The patient transport apparatus as set forth in claim 2, wherein the caster assembly further includes a pin coupled to the support structure and supporting the caster frame for pivoting movement between the plurality of caster orientations, the pin including:
a carrier supporting the first magnetic element, and
a shank extending from the carrier and coupled to the support structure.

7. The patient transport apparatus as set forth in claim 6, wherein the pin defines a pin bore shaped to receive the first magnetic element.

8. The patient transport apparatus as set forth in claim 6, wherein the caster assembly further includes a bearing operatively attached to the caster frame and disposed along the shank of the pin adjacent to the carrier to support the caster frame for pivoting movement between the plurality of caster orientations.

9. The patient transport apparatus as set forth in claim 8, further comprising a holder operatively attached to the caster frame for supporting the second magnetic element, the holder defining a seat shaped to receive at least a portion of the carrier of the pin.

10. The patient transport apparatus as set forth in claim 9, wherein the holder comprises a retainer disposed adjacent to the seat and defining a retainer bore shaped to receive the second magnetic element.

11. The patient transport apparatus as set forth in claim 10, wherein the carrier of the pin defines a pilot face shaped to engage the seat of the holder when the support structure is disposed in the support configuration for traversing floor surfaces; and
   wherein engagement between the pilot face and the seat results in at least partial resistance of pivoting movement of the caster frame to overcome magnetic attraction occurring between the first and second magnetic elements of the biasing mechanism.

12. The patient transport apparatus as set forth in claim 1, wherein the biasing mechanism comprises a spring extending in operable engagement between the support structure and the caster frame to urge the caster frame to pivot toward the stowed caster orientation as the support structure moves from the support configuration to the stowed configuration.

13. The patient transport apparatus as set forth in claim 12, wherein the spring of the biasing mechanism is further defined as an extension spring;
   wherein the caster assembly further includes a pin coupled to the support structure and supporting the caster frame for pivoting movement between the plurality of caster orientations, the pin including a first spring mount;
   wherein the caster frame includes a second spring mount; and
   wherein the extension spring extends between the first spring mount and the second spring mount.

14. The patient transport apparatus as set forth in claim 1, wherein the caster assembly further includes a pin coupled to the support structure and supporting the caster frame for pivoting movement between the plurality of caster orientations, the pin including a guide body and a shank extending from the guide body and coupled to the support structure.

15. The patient transport apparatus as set forth in claim 14, wherein the caster assembly comprises a bearing operatively attached to the caster frame and disposed along the shank of the pin adjacent to the guide body to support the caster frame for pivoting movement between the plurality of caster orientations.

16. The patient transport apparatus as set forth in claim 15, wherein the guide body of the pin defines a ramp surface; and
   wherein the biasing mechanism comprises a follower operatively attached to the caster frame and disposed in sliding contact with the ramp surface of the guide body to urge the caster frame to pivot toward the stowed caster orientation as the support structure moves from the support configuration to the stowed configuration.

17. The patient transport apparatus as set forth in claim 16, wherein the pin defines a swivel axis; and
   wherein the ramp surface of the guide body of the pin extends at least partially helically around the swivel axis and is arranged to disengage from the follower when the support structure operates in the support configuration.

18. The patient transport apparatus as set forth in claim 16, wherein the bearing travels at least partially along the shank of the pin to bring the follower into engagement with the ramp surface of the guide body when the support structure moves from the support configuration to the stowed configuration.

19. The patient transport apparatus as set forth in claim 1, further comprising a rear wheel operatively attached to the support structure, spaced from the caster assembly, and configured to remain in engagement with the floor surfaces as the support structure moves from the support configuration to the stowed configuration.

20. The patient transport apparatus as set forth in claim 1, further comprising:
   a back section for supporting a patient, the back section being operatively attached to the support structure and defining a first plane; and
   a seat section for supporting the patient, the seat section being pivotably coupled to the support structure and defining a second plane arranged at a seat angle relative to the first plane;
   wherein the seat angle increases as the support structure moves from the stowed configuration to the support configuration;
   wherein the wheel is supported for rotation about a wheel axis; and
   wherein the wheel axis intersects the first plane of the back section in the stowed caster orientation.

* * * * *